United States Patent
Kakkar et al.

(10) Patent No.: US 11,500,390 B2
(45) Date of Patent: Nov. 15, 2022

(54) MULTI-SEGMENT TURNS

(71) Applicant: Trimble Inc., Sunnyvale, CA (US)

(72) Inventors: Shantnu Kakkar, Alpharetta, GA (US); Juan Carlos Santamaria, Alpharetta, GA (US); Justin Creaby, Westminster, CO (US); Brandon Sights, San Marcos, CA (US)

(73) Assignee: Trimble Inc., Sunnyvale, CA (US)

( * ) Notice: Subject to any disclaimer, the term of this patent is extended or adjusted under 35 U.S.C. 154(b) by 148 days.

(21) Appl. No.: 16/863,056

(22) Filed: Apr. 30, 2020

(65) Prior Publication Data
US 2021/0341933 A1   Nov. 4, 2021

(51) Int. Cl.
*G05D 1/02* (2020.01)
*G01C 21/00* (2006.01)
(Continued)

(52) U.S. Cl.
CPC ......... *G05D 1/0219* (2013.01); *G01C 21/005* (2013.01); *G01C 21/20* (2013.01);
(Continued)

(58) Field of Classification Search
CPC ............... G05D 1/0219; G05D 1/0212; G05D 2201/0201; G05D 1/0278; G01C 21/20; G01C 21/005; G01S 19/42
See application file for complete search history.

(56) References Cited

U.S. PATENT DOCUMENTS

| | | | |
|---|---|---|---|
| 2009/0240430 A1* | 9/2009 | Sachs ................... | A01B 79/005 |
| | | | 701/408 |
| 2017/0144702 A1 | 5/2017 | Dang et al. | |

(Continued)

FOREIGN PATENT DOCUMENTS

| | | |
|---|---|---|
| EP | 3 146 825 A1 | 3/2017 |
| JP | 2019068784 A * | 5/2019 |

OTHER PUBLICATIONS

Han et al.; Simulation Study to Develop Implement Control and Headland Turning Algorithms for Autonomous Tillage Operations; Journal of Biosystems Engineering (2019) 44: pp. 245-257; Nov. 13, 2019 (Year: 2019).*

(Continued)

*Primary Examiner* — Michael J Zanelli
(74) *Attorney, Agent, or Firm* — Kilpatrick Townsend & Stockton LLP

(57) ABSTRACT

A method of path planning for a vehicle includes receiving a request for a turn from a current swath to a next swath, receiving information of the current swath and information of the next swath, determining a trajectory of the turn based on the information of the current swath and the information of the next swath, and outputting the trajectory to a control system of the vehicle for executing the turn. The trajectory includes a first segment and a second segment. The first segment starts from a beginning position of the turn at the current swath and ends at an intermediate position; and the second segment starts from the intermediate position and ends at an ending position of the turn at the next swath. The vehicle changes from a forward gear to a reverse gear, or vice versa, as the vehicle transitions from the first segment to the second segment.

24 Claims, 23 Drawing Sheets

(51) Int. Cl.
*G01S 19/42* (2010.01)
*G01C 21/20* (2006.01)

(52) U.S. Cl.
CPC ............ *G01S 19/42* (2013.01); *G05D 1/0212* (2013.01); *G05D 2201/0201* (2013.01)

(56) References Cited

U.S. PATENT DOCUMENTS

| | | | |
|---|---|---|---|
| 2018/0359905 A1* | 12/2018 | Foster | A01B 69/008 |
| 2018/0364739 A1 | 12/2018 | Foster et al. | |
| 2019/0146513 A1 | 5/2019 | Tomita et al. | |
| 2019/0353483 A1* | 11/2019 | Liu | G05D 1/0291 |
| 2020/0296878 A1 | 9/2020 | Dix | |

OTHER PUBLICATIONS

Backman et al.; Smooth turning path generation for agricultural vehicles in headlands; Biosystems Engineering 139 (2015) pp. 76-86; Aug. 30, 2015 (Year: 2015).*

Extended European Search Report for Application No. 21170949.8-1004, dated Sep. 30, 2021, 10 pages.

U.S. Appl. No. 16/863,049 Non-Final Office Action dated Feb. 9, 2022, 21 pages.

U.S. Appl. No. 16/863,049 Final Office Action dated Aug. 29, 2022, 23 pages.

* cited by examiner point-to-point point-to-linestring linestring-to-point linestring-to-linestring

MULTI-SEGMENT TURNS

CROSS-REFERENCES TO RELATED APPLICATIONS

The following U.S. Patent Application is being filed concurrently, and the entire disclosure of the other application is incorporated by reference into this application for all purposes:

application Ser. No. 16/863,049, filed Apr. 30, 2020, entitled "HEADLAND-FOLLOWING TURNS".

BACKGROUND

Engineering vehicles such as tractors are widely used in agriculture and construction. For example, a variety of farm implements may be towed behind or mounted on a tractor to perform various agricultural tasks, such as plowing, irrigation, fertilizer and pesticide spraying, seed spraying, harvesting, and the like. Autonomous or semi-autonomous tractors are used for precision agriculture. As another example, compactors may be used to create a level grade in construction projects. Various path planning algorithms may be used to guide an autonomous vehicle. An end-of-row-turn (EORT) path planner may automatically calculate the best possible path to turn the vehicle around from a current swath and approach the next swath. The goals of an EORT path planner may include producing a trajectory that saves time and fuel cost, and reduces damage to crops or avoids other machines and structures.

SUMMARY

According to some embodiments, a method of path planning for an autonomous vehicle to make a turn includes receiving a request for a two-segment turn of a vehicle from a current swath to a next swath in a work area, and in response to receiving the request, receiving information of the current swath and information of the next swath, and determining a trajectory of the turn based on the information of the current swath and the information of the next swath. The trajectory includes a first segment and a second segment. The first segment starts from a beginning position of the turn at the current swath and ends at an intermediate position; and the second segment starts from the intermediate position and ends at an ending position of the turn at the next swath. The vehicle changes from a forward gear to a reverse gear, or vice versa, as the vehicle transitions from the first segment to the second segment. The method further includes outputting the trajectory to a control system of the vehicle for executing the turn by following the first segment and the second segment of the trajectory successively.

According to some embodiments, a method of path planning for an autonomous vehicle to make a turn includes receiving a request for a three-segment turn of a vehicle from a current swath to a next swath in a work area. The request specifies that the turn is to follow a guidance line in a headland at a periphery of the work area. The method further includes, in response to receiving the request, receiving information of the current swath, information of the next swath, and information of the guidance line, and determining a trajectory of the turn based on the information of the current swath, the information of the next swath, and the information of the guidance line. The trajectory includes a first segment, a second segment, and a third segment. The first segment starts from a beginning position of the turn at the current swath and ends at a first intermediate position on the guidance line. The second segment starts from the first intermediate position, moving along the guidance line, and ends at a second intermediate position on the guidance line. The vehicle changes from a forward gear to a reverse gear, or vice versa, as the vehicle transitions from the first segment to the second segment. The third segment starts from the second intermediate position and ends at an ending position of the turn at the next swath. The vehicle changes from the reverse gear to the forward gear, or vice versa, as the vehicle transitions from the second segment to the third segment. The method further includes outputting the trajectory to a control system of the vehicle for executing the turn by following the first segment, the second segment, and the third segment of the trajectory successively.

According to some embodiments, a method of path planning for an autonomous vehicle to make a turn includes receiving a request for a turn of a vehicle from a current swath to a next swath in a work area. The work area has a headland at a periphery thereof, and the headland is characterized by a guidance line therethrough. The method further includes, in response to receiving the request, receiving information of the current swath, information of the next swath, and information of the guidance line, and determining a trajectory of the turn based on the information of the current swath, the information of the next swath, and the information of the guidance line. The trajectory includes one or more segments. At least a portion of a first segment of the one or more segments follows the guidance line in the headland. The method further includes, outputting the trajectory to a control system of the vehicle for executing the turn.

According to some embodiments, a system for path planning for a vehicle includes a user interface configured to enable a user to initiate a request for a turn from a current swath to a next swath in a work area. The work area has a headland at a periphery thereof. The system further includes a memory storing information of a guidance line in the headland, and a path planning module coupled to the memory and the user interface. The path planning module is configured to, in response to receiving the request for the turn, receive information of the current swath and information of the next swath, and determine a trajectory of the turn based on the information of the current swath, the information of the next swath, and the information of the guidance line. The trajectory includes one or more segments. At least a portion of a first segment of the one or more segments follows the guidance line.

DETAILED DESCRIPTION

Embodiments of the present invention provide path planning to enable an autonomous vehicle to make a turn from one swath to another swath in an optimal amount of time and minimal travel distance, with minimal crop damage and/or avoiding obstacles (e.g., avoiding other machines, equipment, and structures on a construction site). In some embodiments, a user may be able to select a multi-segment turn, in which the vehicle may transition from a forward segment (i.e., the vehicle moving in the direction it is facing) to a reverse segment (i.e., the vehicle moving in an opposite direction from the direction it is facing), or vice versa. In some embodiments, the user may be able to select a headland-following (HF) turn, in which at least a portion of the trajectory of the turn follows a guidance line in the headland (see definitions of "headland" and "guidance line" below). The path planning algorithms are applicable to curved guidance lines, as well as straight guidance lines. They are also applicable to curved swaths as well as straight swaths, and parallel swaths as well as non-parallel swaths.

The term "geofence" may refer to a geographical boundary of a work area (e.g., an agricultural field, a construction site, and the like) that no part of the vehicle is permitted to go beyond. The term "boundary" may refer to any polygon that is either identical to the geofence or is inwardly offset from the geofence. For example, a farmer may drive the vehicle around the crop rows to record a boundary of the work area. In construction applications, information of the boundary may be available by construction surveys and the site design. Information of the boundary may also be obtained by manually walking up the boundary, by using an autonomous ground vehicle (AGV), or the like. The boundary information may be input to a path planner for algorithmic computation. The boundary may be used as the geofence. The term "headland" may refer to the region between the geofence and a second boundary inwardly offset from the geofence.

Figure 1:
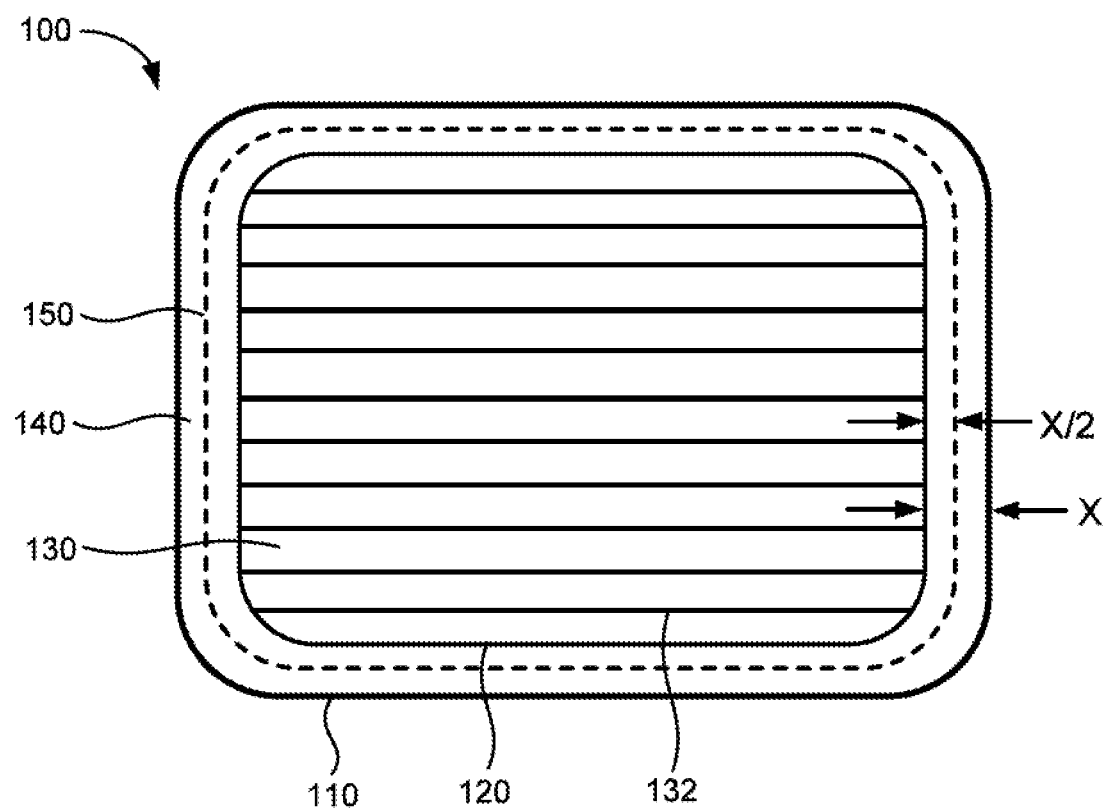
FIG. 1 illustrates an exemplary field.

FIG. 1 illustrates an exemplary work area 100. The work area 100 has a boundary or geofence 110. A second boundary 120 is inwardly offset from the geofence 110. The region inside the second boundary 120 may be the cropped area 130 with many swaths 132. The region between the geofence 110 and the second boundary 120 may be referred to herein as the headland 140. The geofence 110 may be referred to as the outer boundary of the headland 140. The second boundary 120 may be referred to as the inner boundary of the headland 140 or as the headland boundary. The offset distance between the geofence 110 and the second boundary 120 may be referred to as the width of the headland 140. A headland 140 may have a width that is an integer multiple of the implement width X being used. For instance, in the example illustrated in FIG. 1, the width of the headland is equal to the implement width X.

The term "headland pattern" may refer to a guidance line 150 inside the headland 140 that may be used as a route for a vehicle to traverse along to fill the headland 140. For instance, in the example illustrated in FIG. 1, the guidance line 150 may be offset from the headland boundary 120 by a distance that is equal to one half of the implement width X. There may be multiple guidance lines depending on the relationship between the width of the headland 140 and the implement width X.

Figure 2A:
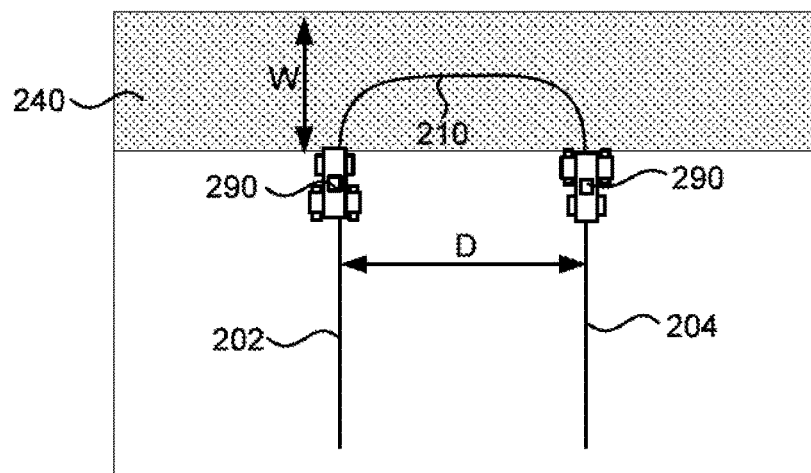
FIG. 2A illustrates an example of a U-shaped one-segment turn.

When an autonomous vehicle needs to make an end-of-row turn to switch from a current swath to a next swath, the trajectory of the turn may follow a U-shape or a bulb-shape. FIG. 2A illustrates an example of a U-shaped turn. The vehicle 290 is moving in the forward direction (i.e., in the direction it is facing) on the current swath 202 before the turn. The vehicle 290 continue to move in the forward direction along the U-shaped trajectory 210 of the turn to reach the next swath 204. In order to avoid or minimize crop damage, it may be desirable that the trajectory 210 of the turn is confined to the headland 240 if possible. The U-shaped turn may be possible when the distance D between the current swath 202 and the next swath 204 is wide enough.

Figure 2B:
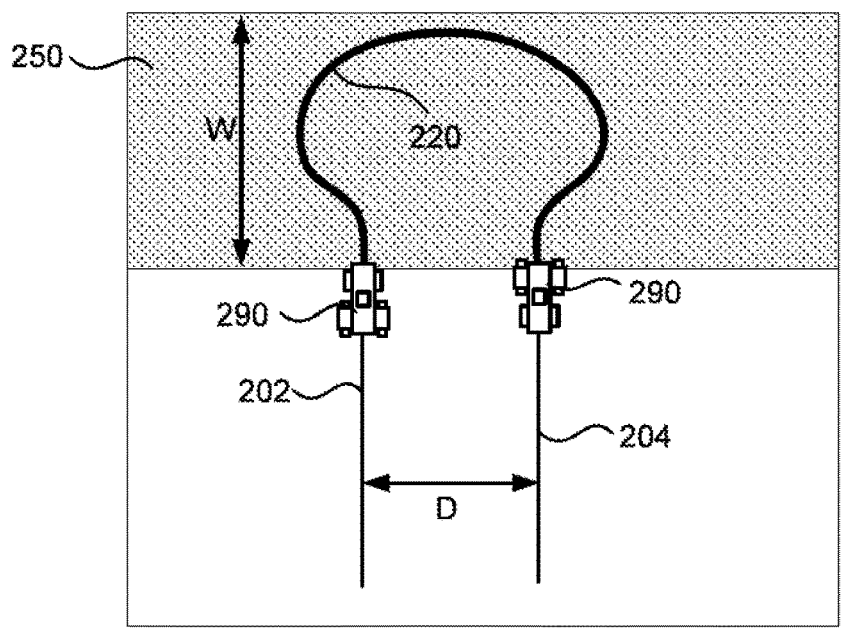
FIGS. 2B and 2C illustrate some examples of bulb-shaped one-segment turns.
Figure 2C:
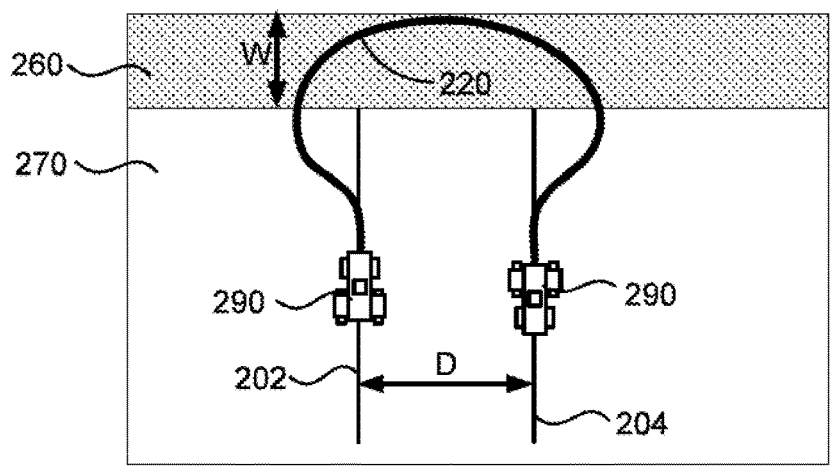

When the distance D between the current swath 202 and the next swath 204 is not wide enough, the vehicle 290 may need to make a bulb-shaped turn, as illustrated in FIG. 2B. Here, along the trajectory 220 of the turn, the vehicle 290 first turns slightly to the left away from the next swath 204, then turns around and overshoot to the right slightly, before reaching the next swath 204. In order for the trajectory 220 to be confined to the headland 250, the bulb-shaped turn may require a wider width W of the headland 250 as compared to the U-shaped turn illustrated in FIG. 2A. As illustrated in FIG. 2C, for a narrower headland 260, some parts of the trajectory 220 may traverse the crop area 270, and therefore may cause more damage to the crop.

The U-shaped turn illustrated in FIG. 2A and the bulb-shaped turn illustrated in FIGS. 2B and 2C may be referred to as one-segment turn type, since the vehicle 290 stays in the same gear (e.g., the forward gear) along the trajectory of the turn.

Multi-Segment Turns

According to some embodiments, a path planner may allow multi-segment turn types. A trajectory of a multi-segment turn may include two or more segments, in which the vehicle may switch from the forward gear to the reverse gear, or vice versa, as it transitions from one segment to a next segment.

Figure 3A:
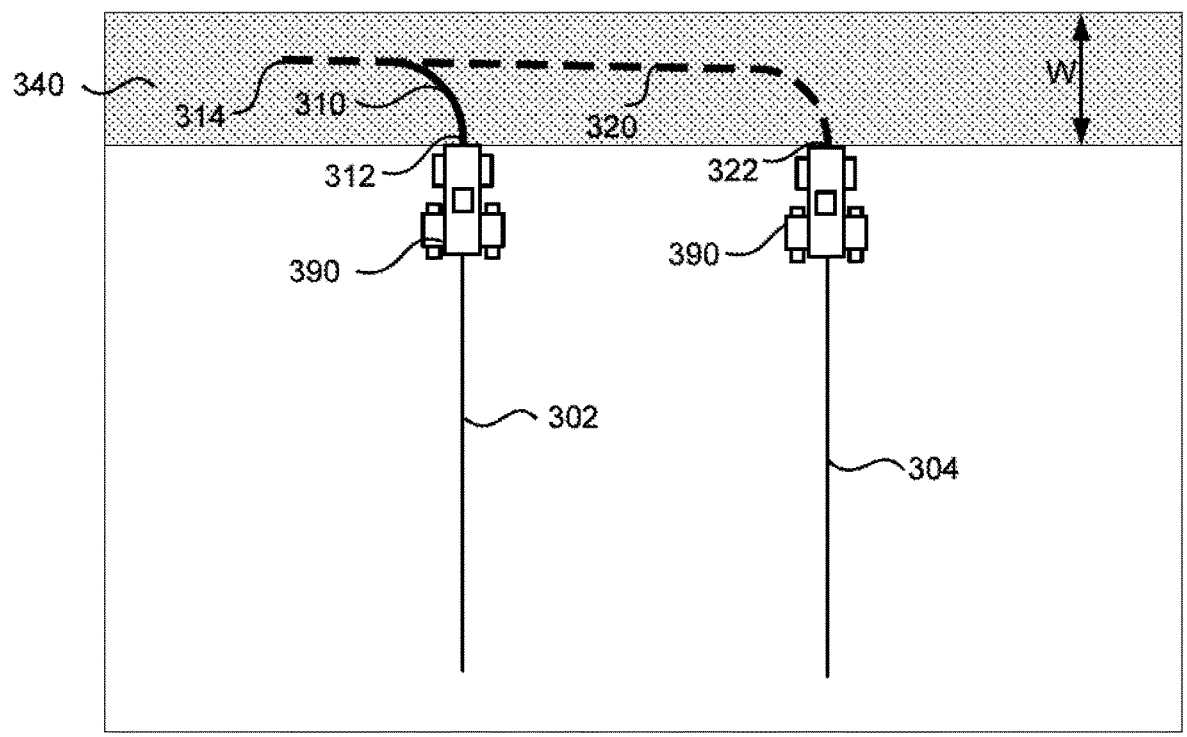
FIGS. 3A-3C illustrate some examples of two-segment turns according to some embodiments.

FIG. 3A illustrates an exemplary two-segment turn according to some embodiments. A vehicle 390 is making the turn to transition from a current swath 302 to a next swath 304. The trajectory of the two-segment turn may include a first segment 310 and a second segment 320. In the first segment 310, the vehicle 390 may start from a beginning position 312 of the turn, move away from the next swath 304, and end at an intermediate position 314. In the second segment 320, the vehicle 390 may start from the intermediate position 314, move toward the next swath 304, and end at the ending position 322 of the turn.

As illustrated in FIG. 3A, the vehicle 390 may be in the forward gear (i.e., the vehicle 390 moves in the direction it is facing) during the first segment 310 (thus, the first segment 310 is represented by a solid line), and switch to the reverse gear (i.e., the vehicle moves in the direction opposite to where it is facing) as it transitions to the second segment 320 (thus, the second segment 320 is represented by a dashed line). This situation may be applicable when the vehicle 390 traverses the current swath 302 in the forward gear before the turn started. After the turn, the vehicle 390 may traverse the next swath 304 in the reverse gear.

Figure 3B:
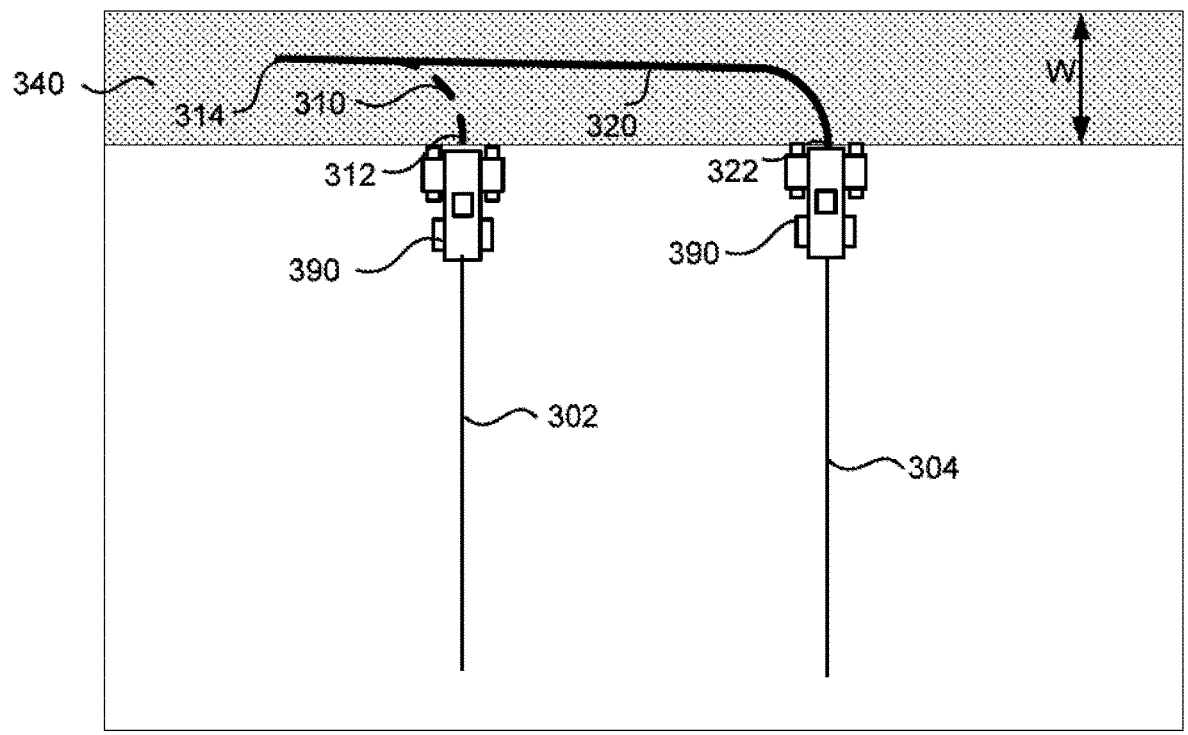

As illustrated in FIG. 3B, if the vehicle 390 traverses the current swath 302 in the reverse gear, the vehicle 390 may be in the reverse gear during the first segment 310, and switch to the forward gear as it transitions to the second segment 320. After the turn, the vehicle 390 may traverse the next swath 304 in the forward gear. Therefore, in a two-segment turn, the vehicle 390 may traverse the next swath 304 in a gear that is opposite to that in the current swath 302 (e.g., from forward to reverse, or from reverse to forward).

Compared to the bulb-shaped one-segment turn illustrated in FIGS. 2B and 2C, the two-segment turn illustrated in FIGS. 3A and 3B may allow the entire trajectory of the turn to be confined within the headland 340 even if the headland has a relatively narrow width W. Thus, crop damage may be avoided or minimized. The two-segment turn may also allow a shorter total traveling distance during the turn as compared to a bulb-shaped one-segment turn, and thus may save time and fuel cost. Therefore, the two-segment turn may be more advantageous.

Figure 3C:
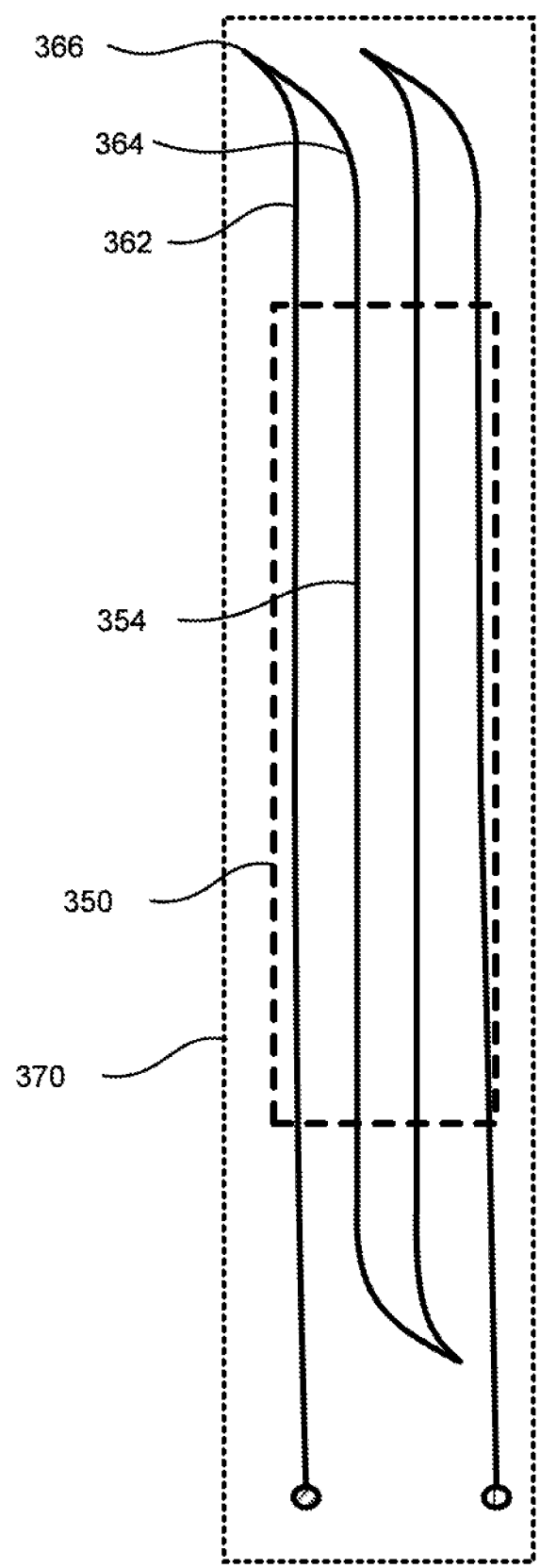

FIG. 3C illustrates an exemplary two-segment turn for a compactor in a construction environment according to some embodiments. The short-dashed line 370 indicates a street. The dashed line 350 indicates a work area (e.g., a portion of the street 370 that needs to be compacted). The solid line 354 illustrates the trajectory of the compactor. Once the compactor finishes a swath, it needs to transition to the next swath. In this example, the compactor makes a two-segment turn to transition from a current swath to a next swath. For example, in a first segment 362, the compactor may travel forward to an intermediate position 366, and reverse to the next swath. The compactor may progress swath by swath until the entire work area 350 is completed.

Figure 4A:
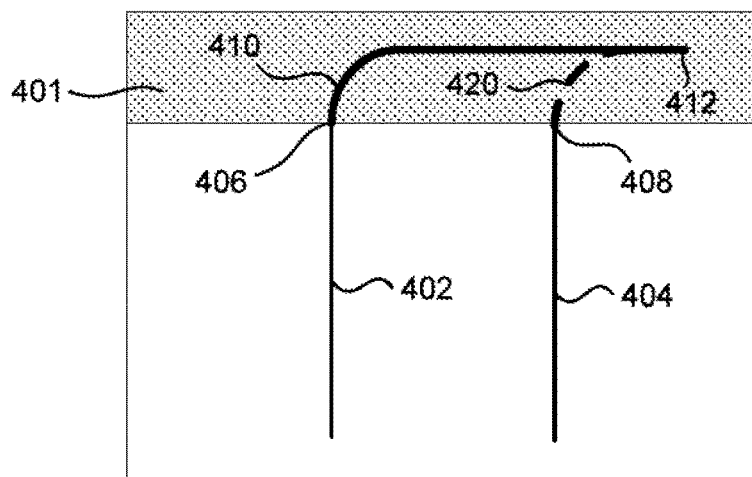
FIGS. 4A-4C illustrate some additional examples of two-segment turns according to some embodiments.

FIG. 4A illustrates an alternative shape of a two-segment turn according to some embodiments. Here, in the first segment 410 of the turn, a vehicle may start from the beginning position 406 of the turn, move toward the headland 401 and then toward the next swath 404, and end at an intermediate position 412. In the second segment 420 of the turn, the vehicle may start from the intermediate position 412 and end at the ending position 408 of the turn.

Figure 4B:
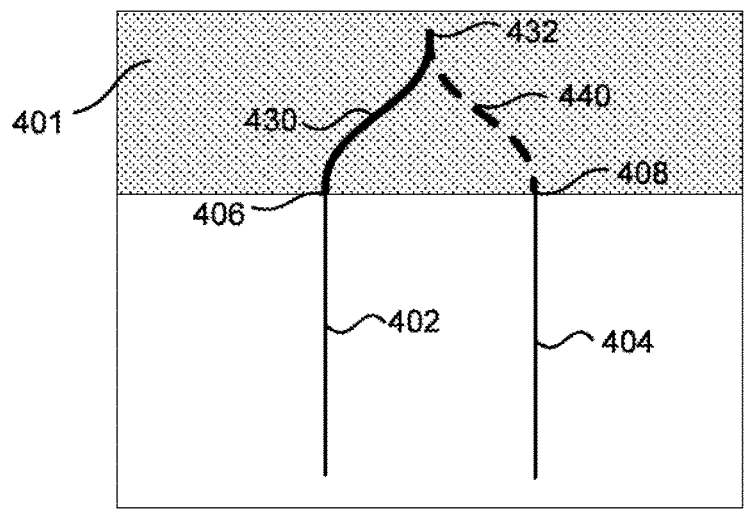

FIG. 4B illustrates another alternative shape of a two-segment turn according to some embodiments. Here, in the first segment 430 of the turn, a vehicle may start from the beginning position 406 of the turn, move toward the headland 401 and slightly toward the next swath 404, and end at an intermediate position 432 that lies laterally about midway between the current swath 402 and the next swath 404. In the second segment 440 of the turn, the vehicle may start from the intermediate position 432 and end at the ending position 408 of the turn. In this case, in order for the entire trajectory of the two-segment turn to be confined within the headland 401 so as to minimize crop damage, it may require a wider headland as compared to the two-segment turn illustrated in FIGS. 3A-3B and 4A.

Figure 4C:
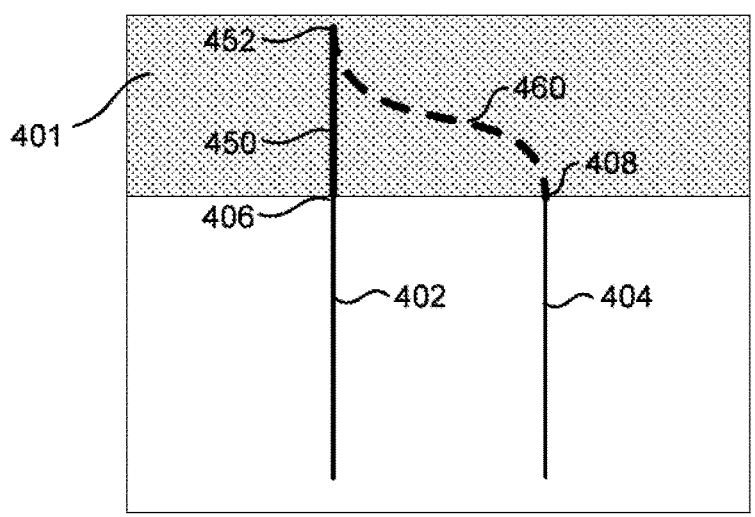

FIG. 4C illustrates a further alternative shape of a two-segment turn according to some embodiments. Here, in the first segment 450 of the turn, a vehicle may start from the beginning position 406 of the turn, move straight toward the headland 401, and end at an intermediate position 452. In the second segment 460 of the turn, the vehicle may start from the intermediate position 452, and end at the ending position 408 of the turn. In this case, in order for the entire trajectory of the two-segment turn to be confined within the headland 401 so as to minimize crop damage, it may also require a wider headland as compared to the two-segment turn illustrated in FIGS. 3A-3B and 4A.

Figure 5A:
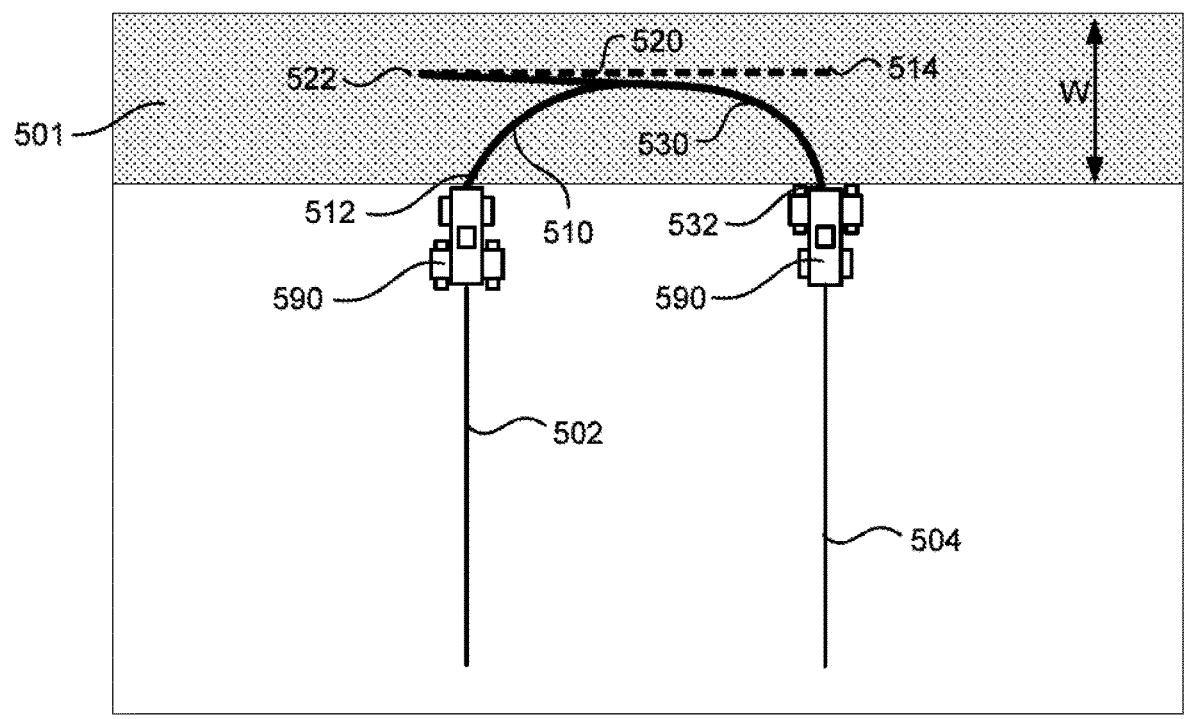
FIGS. 5A and 5B illustrate some examples of three-segment turns according to some embodiments.

FIG. 5A illustrates an exemplary three-segment turn according to some embodiments. A vehicle 590 is making the turn to transition from a current swath 502 to a next swath 504. The trajectory of the three-segment turn may include a first segment 510, a second segment 520, and a third segment 530. In the first segment 510, the vehicle 590 may start from the beginning position 512 of the turn, move toward the next swath 504, and ends at a first intermediate position 514. In the second segment 520, the vehicle 590 may start from the first intermediate position 514, move away from the next swath 504, and ends at a second intermediate position 522. In the third segment 530, the vehicle 590 may start from the second intermediate position 522, move toward the next swath 504, and ends at the ending position 532 of the turn.

As illustrated in FIG. 5A, the vehicle 590 may be in the forward gear during the first segment 510, switch to the reverse gear as it transitions to the second segment 520, and switch to the forward gear again as it transitions to the third segment 530. This situation may be applicable when the vehicle 590 traverses the current swath 502 in the forward gear before the turn started. After the turn, the vehicle 590 may continue to traverse the next swath 504 in the forward gear.

Figure 5B:
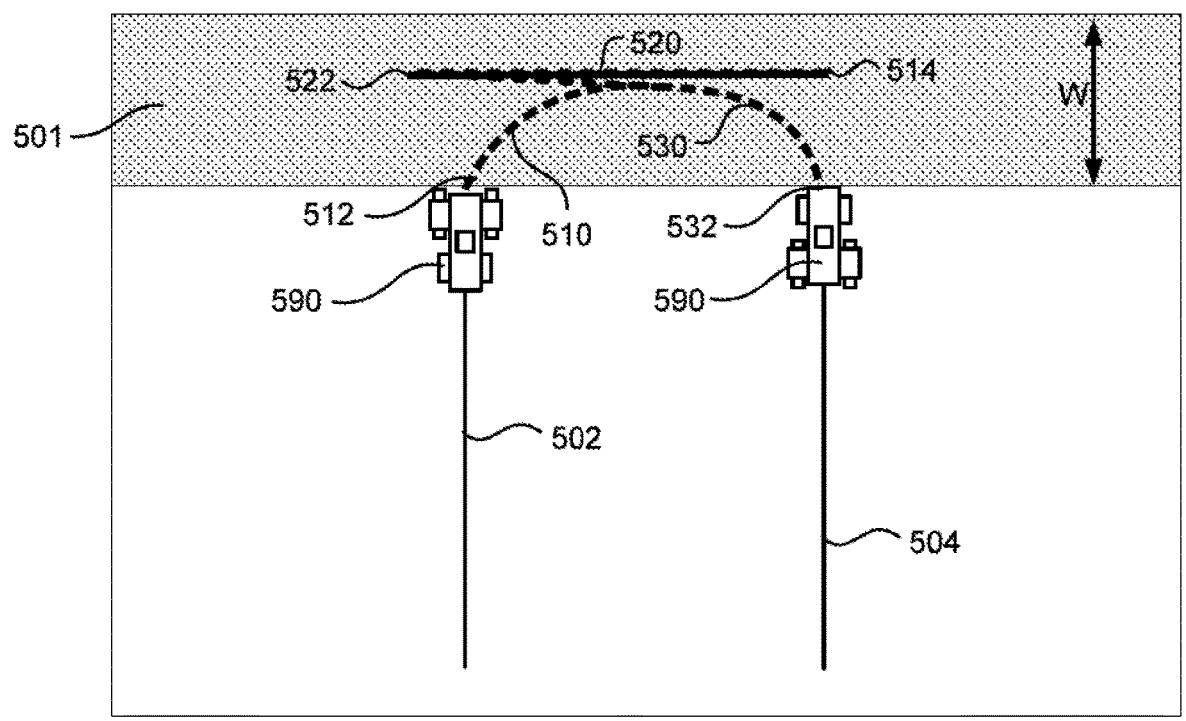

As illustrated in FIG. 5B, if the vehicle 590 traverses the current swath 502 in the reverse gear, the vehicle 590 may be in the reverse gear during the first segment 510, switch to the forward gear as it transitions to the second segment 520, and switch to the reverse gear again as it transitions to the third segment 530. After the turn, the vehicle 590 may continue to traverse the next swath 504 in the reverse gear. Thus, in a three-segment turn, the vehicle 590 may traverse the next swath 504 in a gear that is the same as in the current swath 502. Therefore, if a user wishes to traverse the next swath in the same gear as in the current swath, the user may select a three-segment turn. On the other hand, if the user wishes to traverse the next swath in a gear that is opposite to that in the current swath, the user may select a two-segment turn, as discussed above with reference to FIGS. 3A and 3B.

Similar to the two-segment turn, the three-segment turn illustrated in FIGS. 5A and 5B may also allow the entire trajectory of the turn to be confined within the headland 501 even if the headland 501 has a relatively narrow width W. Thus, crop damage may be avoided or minimized. It should be noted that multi-segment turns with more than three segments are also possible according to some embodiments.

Headland Following (HF) Turns

According to some embodiments, a path planner may enable a turn to follow a headland pattern. Such a turn may be referred herein as a headland-following (HF) turn type. In a HF turn, at least part of the trajectory during the turn will follow a guidance line in the headland. In other words, the shape of the trajectory may adaptively change depending on the shape of the guidance line.

Figure 6A:
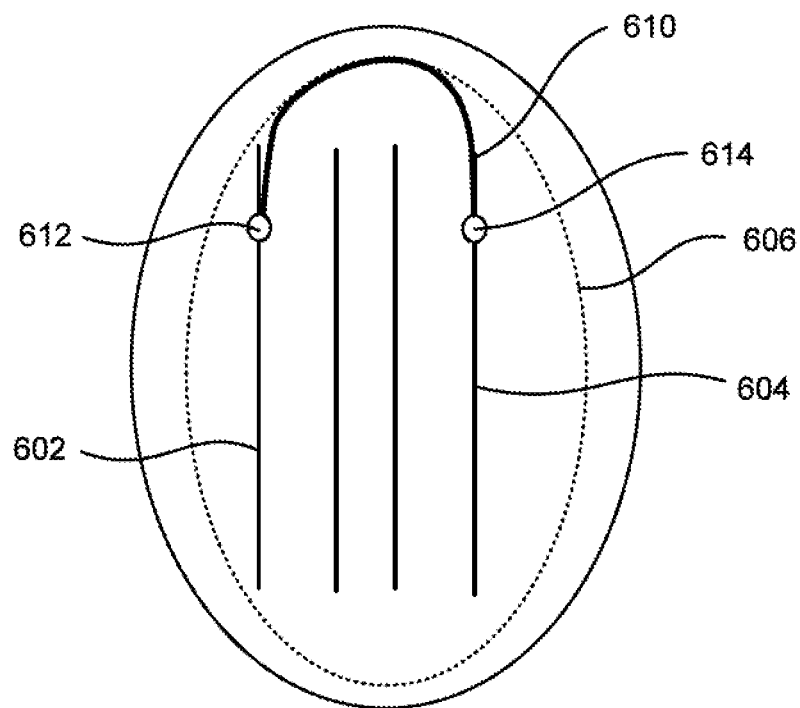
FIGS. 6A and 6B illustrate some examples of one-segment headland-following (HF) turns according to some embodiments.

FIG. 6A illustrates a one-segment HF turn according to some embodiments. The one-segment turn is for a vehicle to transition from a current swath 602 to a next swath 604 (in this example, the next swath 604 is not immediately adjacent to the current swath 602). The crop area is bounded by a guidance line 606 in the headland (i.e., a headland pattern). In this example, the guidance line 606 has an oval shape. In the trajectory 610 of the one-segment HF turn, a vehicle may start from the beginning position 612 of the turn, move toward the guidance line 606, then follow the guidance line 606 for some distance in the direction toward the next swath 604, and end at the ending position 614 of the turn. As illustrated, the trajectory 610 of the one-segment turn does not need to have a fixed shape (e.g., a bulb-shape or a U-shape); instead, the trajectory is adapted so that at least a portion of the trajectory 610 follows the guidance line 606.

Figure 6B:
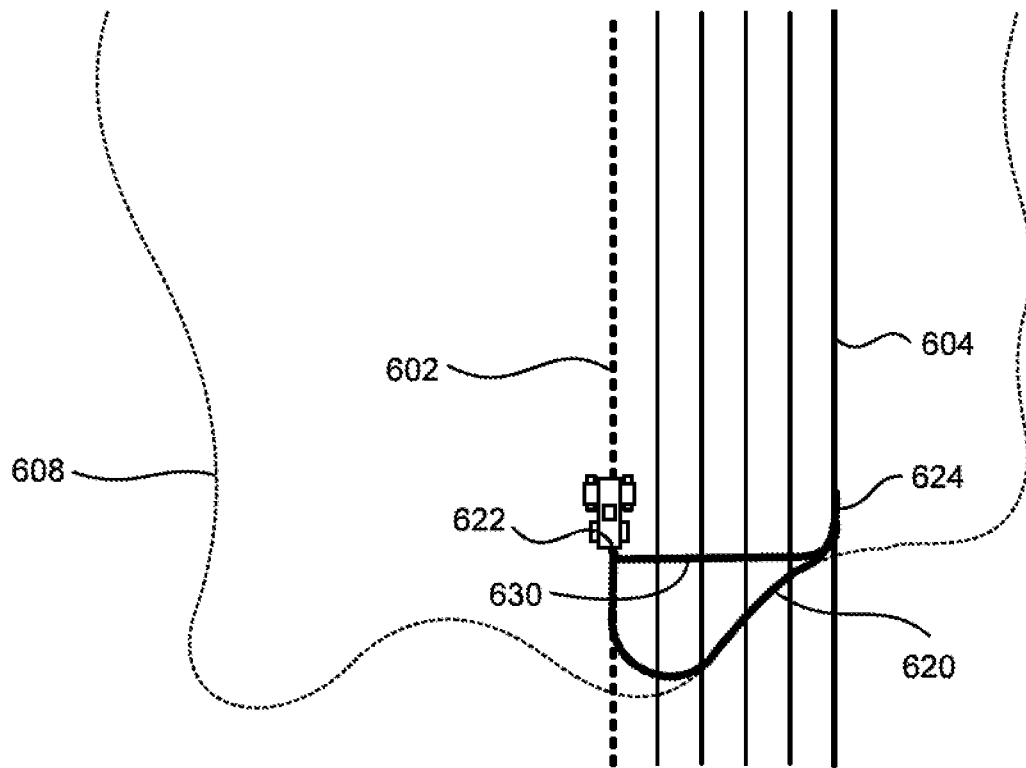

FIG. 6B illustrates another example of a one-segment HF turn according to some embodiments. Here, the guidance line 608 has an irregular curved shape. In the trajectory 620 of the one-segment HF turn, a vehicle may start from the beginning position 622 of the turn, move toward the guidance line 608, then follow the guidance line 608 for some distance toward the next swath 604, and end at the ending position 624 of the turn. In this example, the trajectory 620 of the turn is mostly along the guidance line 608. Therefore, crop damage may be minimized. In contrast, in a fixed-pattern U-shape turn, the trajectory 630 of the turn may traverse several swaths, and therefore may result in more crop damage.

Figure 7A:
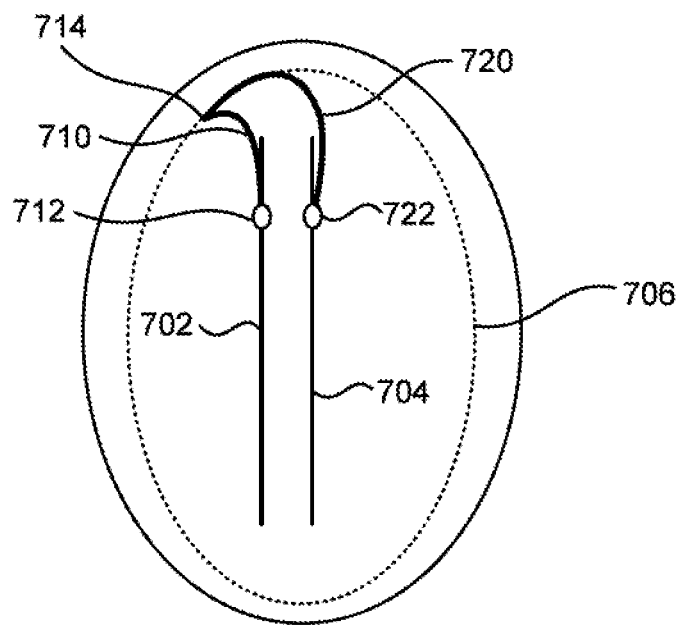
FIGS. 7A and 7B illustrate some examples of two-segment HF turns according to some embodiments.

FIG. 7A illustrates a two-segment HF turn according to some embodiments. The crop area is bounded by a guidance line 706 in the headland. The trajectory of the two-segment turn includes a first segment 710 and a second segment 720. In the first segment 710, a vehicle may start from the beginning position 712 of the turn at the current swath 702, move toward the guidance line 706, and end at an intermediate position 714 at the guidance line 706. In the second segment 720, the vehicle may start from the intermediate position 714, move along the guidance line 706 for some distance toward the next swath 704, and end at the ending position 722 of the turn. Here, again, the exact geometry of the trajectory is not fixed; instead, it is adapted so that a portion of the trajectory follows the guidance line 706.

Figure 7B:
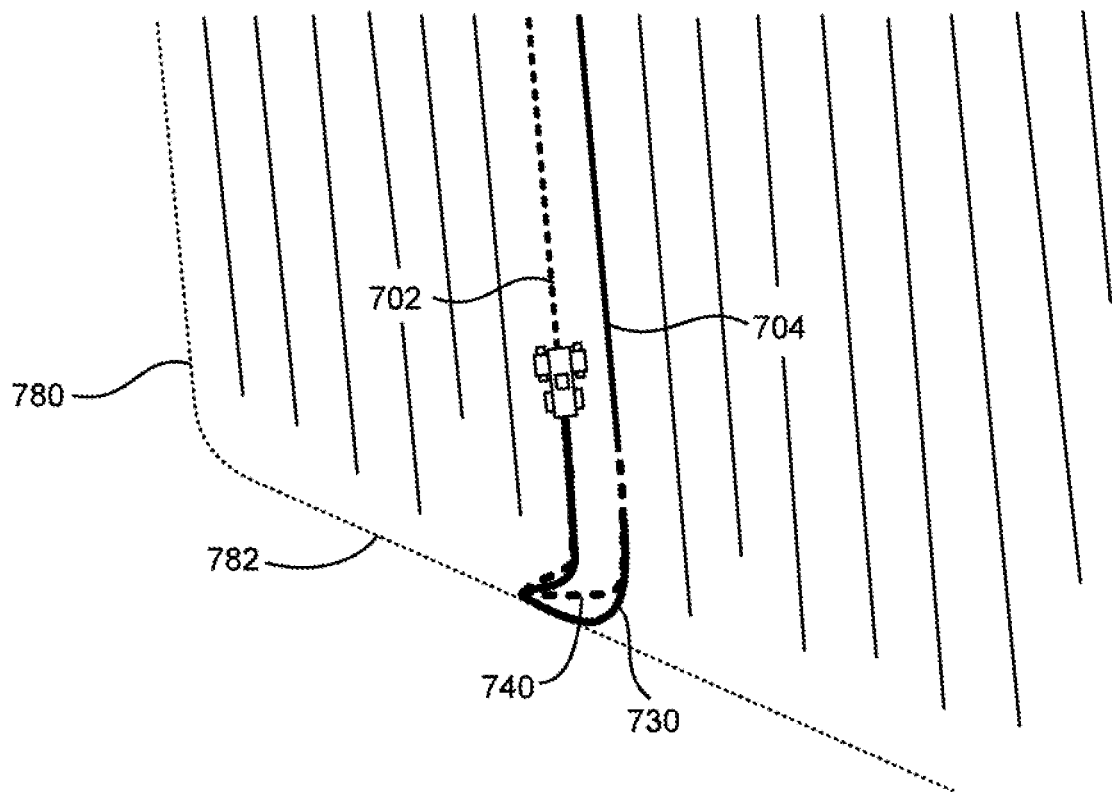

FIG. 7B illustrates another example of a two-segment HF turn according to some embodiments. In this example, the guidance line 780 includes a section 782 that is at an oblique angle (i.e., neither perpendicular nor parallel) with respect to the direction of the swaths (e.g., the current swath 702 and the next swath 704). In the two-segment HF-turn, a portion of the trajectory 730 follows along the guidance line 780, so that the trajectory 730 is mostly along either a swath or the guidance line 780. Therefore, crop damage may be minimized. In contrast, in a fixed-pattern two-segment turn, the trajectory 740 may go over the crops, and therefore may result in more crop damage.

Figure 8A:
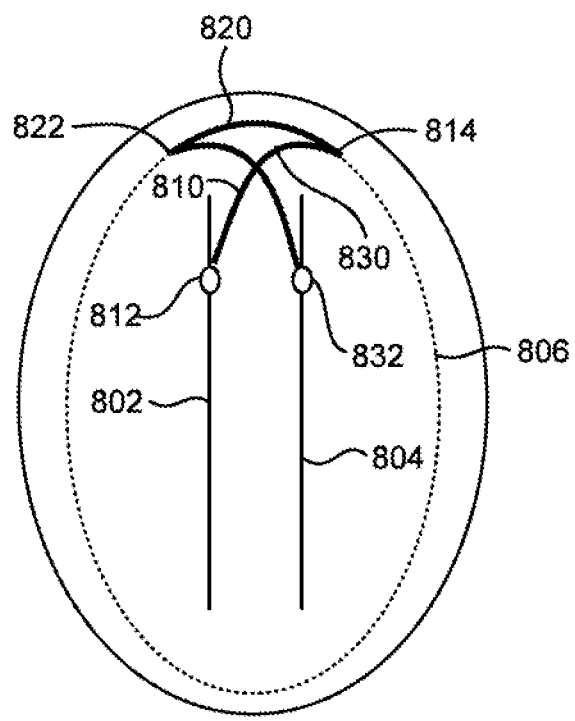
FIGS. 8A-8C illustrate some examples of three-segment HF turns according to some embodiments.

FIG. 8A illustrates a three-segment HF turn according to some embodiments. The crop area is bounded by a guidance line 806 in the headland. The trajectory of the three-segment HF turn includes a first segment 810, a second segment 820, and a third segment 830. In the first segment 810, a vehicle may start from the beginning position 812 of the turn at the current swath 802, move toward the guidance line 806 in the direction toward the next swath 804, and ends at a first intermediate position 814 at the guidance line 806. In the second segment 820, the vehicle may start from the first intermediate position 814, move along the guidance line 806 for some distance in the direction away from the next swath 804, and ends at a second intermediate position 822 at the guidance line 806. In the third segment 830, the vehicle may start from the second intermediate position 822, move toward the next swath 804, and ends at the ending position 832 of the turn at the next swath 804. Here, again, the exact geometry of the trajectory is not fixed; instead, it is adapted so that a portion of the trajectory (e.g., the second segment 820) follows the guidance line 806.

Figure 8B:
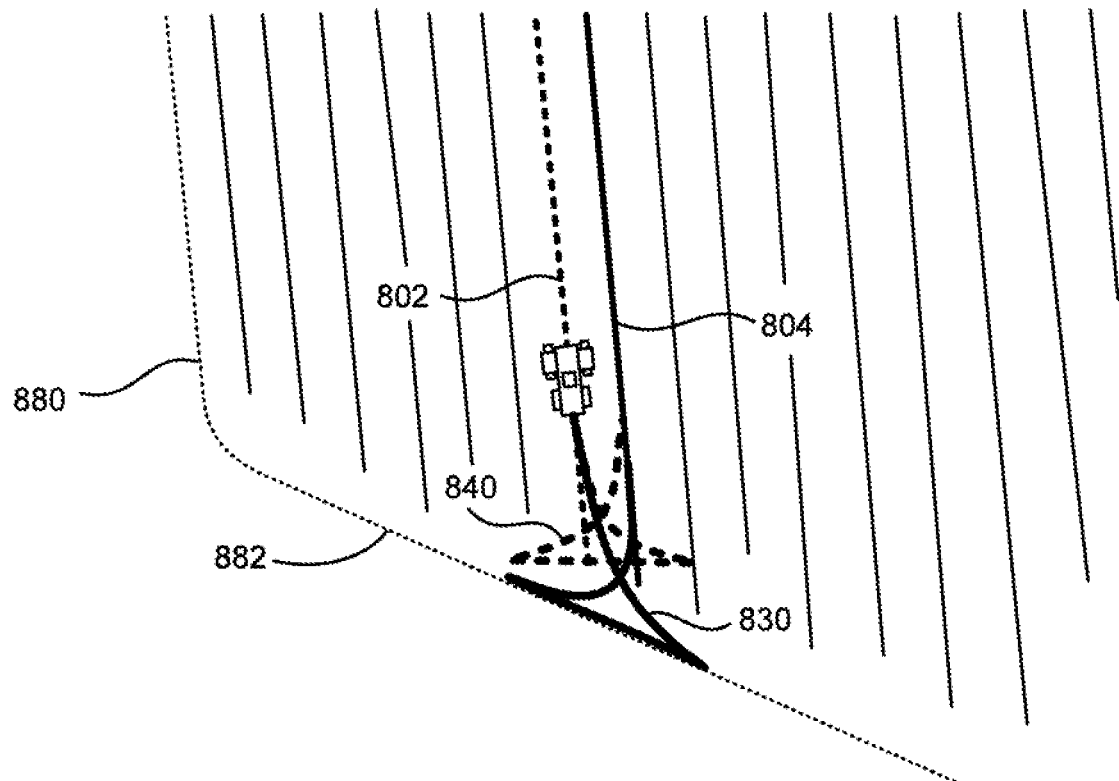

FIG. 8B illustrates another example of a three-segment HF turn according to some embodiments. In this example, the guidance line 880 includes a section 882 that is at an oblique angle with respect to the direction of the swaths (e.g., the current swath 802 and the next swath 804). In a three-segment HF turn, a portion of the trajectory 830 (e.g., the second segment) follows along the guidance line 880. Therefore, crop damage may be minimized. In contrast, in a fixed-pattern three-segment turn, the trajectory 840 may go over the crops, and therefore may result in more crop damage.

Figure 8C:
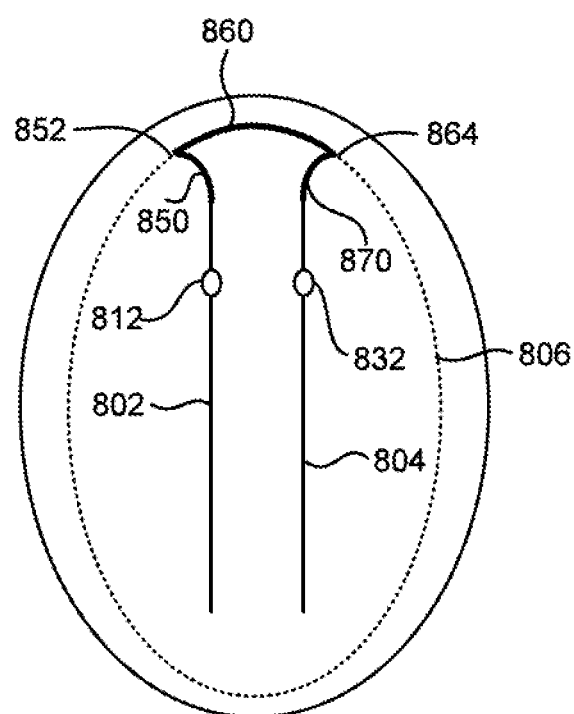

FIG. 8C illustrates another example of a three-segment HF turn according to some embodiments. The trajectory of the three-segment HF turn includes a first segment 850, a second segment 860, and a third segment 870. In the first segment 850, a vehicle may start from the beginning position 812 of the turn at the current swath 802, move toward the guidance line 806 in the direction away from the next swath 804, and ends at a first intermediate position 852 at the guidance line 806. In the second segment 860, the vehicle may start from the first intermediate position 852, move along the guidance line 806 for some distance in the direction toward the next swath 804, and ends at a second intermediate position 864 at the guidance line 806. In the third segment 870, the vehicle may start from the second intermediate position 864, move toward the next swath 804, and ends at the ending position 832 of the turn at the next swath 804. Here, again, the exact geometry of the trajectory is not fixed; instead, it is adapted so that a portion of the trajectory (e.g., the second segment 860) follows the guidance line 806.

According to some embodiments, if an HF turn is chosen, the path planner may generate a trajectory that first takes the vehicle from its current position to the beginning position of the turn, then executes the turn. This feature is referred to as the move-to-start-of-turn (MST).

Figure 9A:
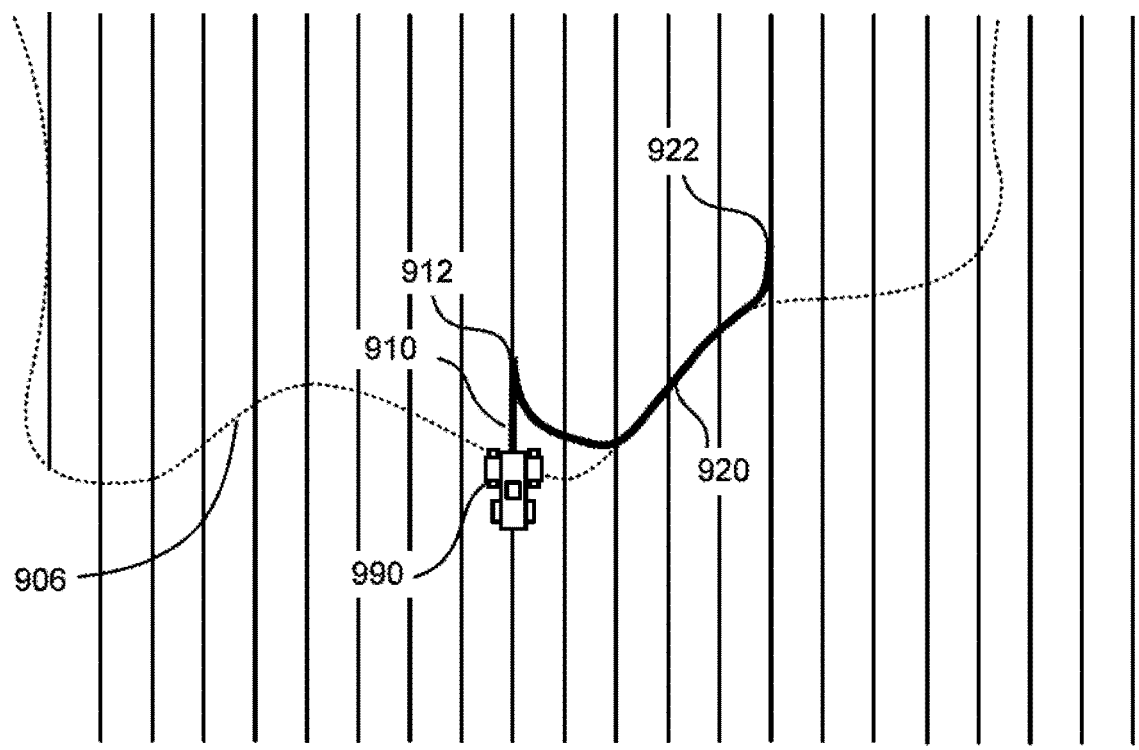
FIG. 9A illustrates an exemplary one-segment HF turn with the move-to-start-of-turn (MST) feature according to some embodiments.

FIG. 9A illustrates an exemplary one-segment HF turn with the MST feature according to some embodiments. In this example, the vehicle 990 is in the forward gear before the turn, and its current position is closer to the guidance line 906 than the beginning position 912 of the turn. The trajectory may include a first segment 910, during which the vehicle 990 backs up (in a reverse gear) from its current position to the beginning position 912 of the turn. During a second segment 920 of the trajectory, the vehicle 990 makes the turn in the forward gear from the beginning position 912 to the ending position 922 of the turn. A portion of the second segment 920 follows the guidance line 906. In this example, although it is a one-segment turn type, the trajectory of the vehicle 990 includes two segments due to the MST feature.

Figure 9B:
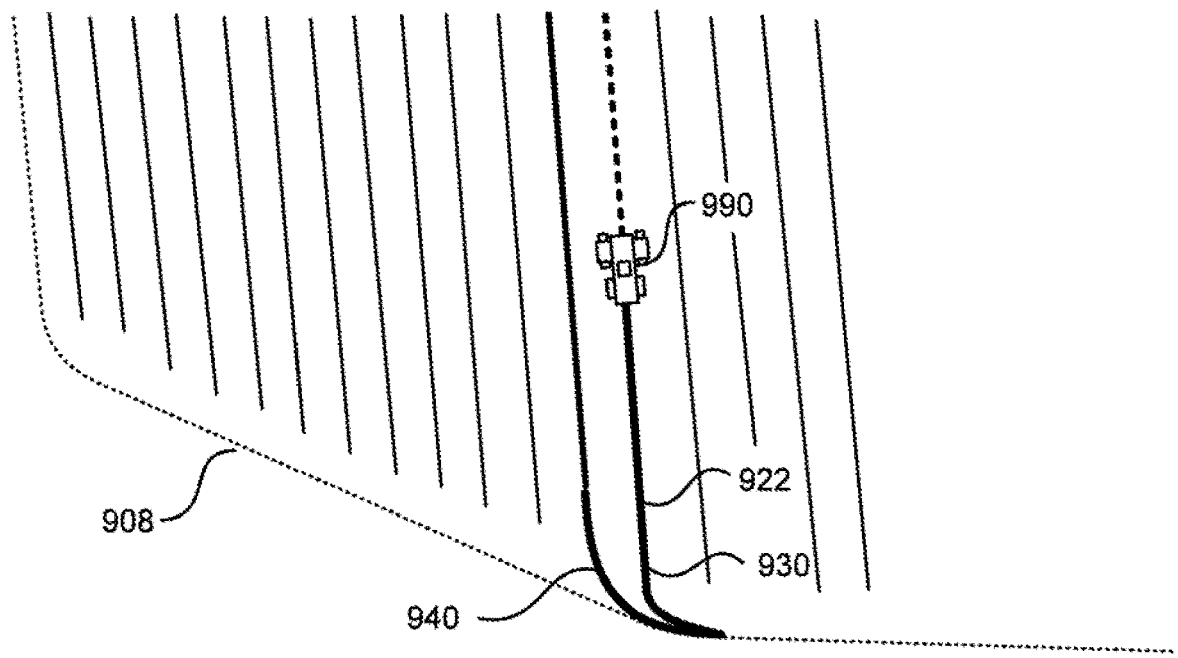
FIG. 9B illustrates an exemplary two-segment HF turn with the MST feature according to some embodiments.

FIG. 9B illustrates an exemplary two-segment HF turn with the MST feature according to some embodiments. In this example, the vehicle 990 is in the forward gear before the turn, and its current position is farther away from the guidance line 906 than the beginning position 912 of the turn. The trajectory may first take the vehicle 990 from its current position to the beginning position 922 of the turn in the forward gear, then executes a first segment 930 of turn in the forward gear, followed by a second segment 940 of the turn in the reverse gear. In this example, the trajectory includes only two segments; that is, the trajectory from its current position to the beginning position 922 of the turn and the first segment 930 of the turn are considered as one segment, since the vehicle 990 is in the same gear therethrough. On the other hand, if the vehicle's current position is closer to the guidance line 906 than the beginning position 922 of the turn, the trajectory may include three segments.

The MST feature may also be applied to three-segment turns in a similar fashion.

According to some embodiments, a user may select a move-to-end-of-swath-before-turn (MESBT) option. If the MESBT option is turned on, a path planner may produce a trajectory in which the vehicle first moves from its current position to an end position of the current swath, then moves from the end position of the current swath to the beginning position of the turn, then executes the turn. The MESBT feature may be applied to one-segment turns, as well as to multi-segment turns with two or more segments.

Figure 10:
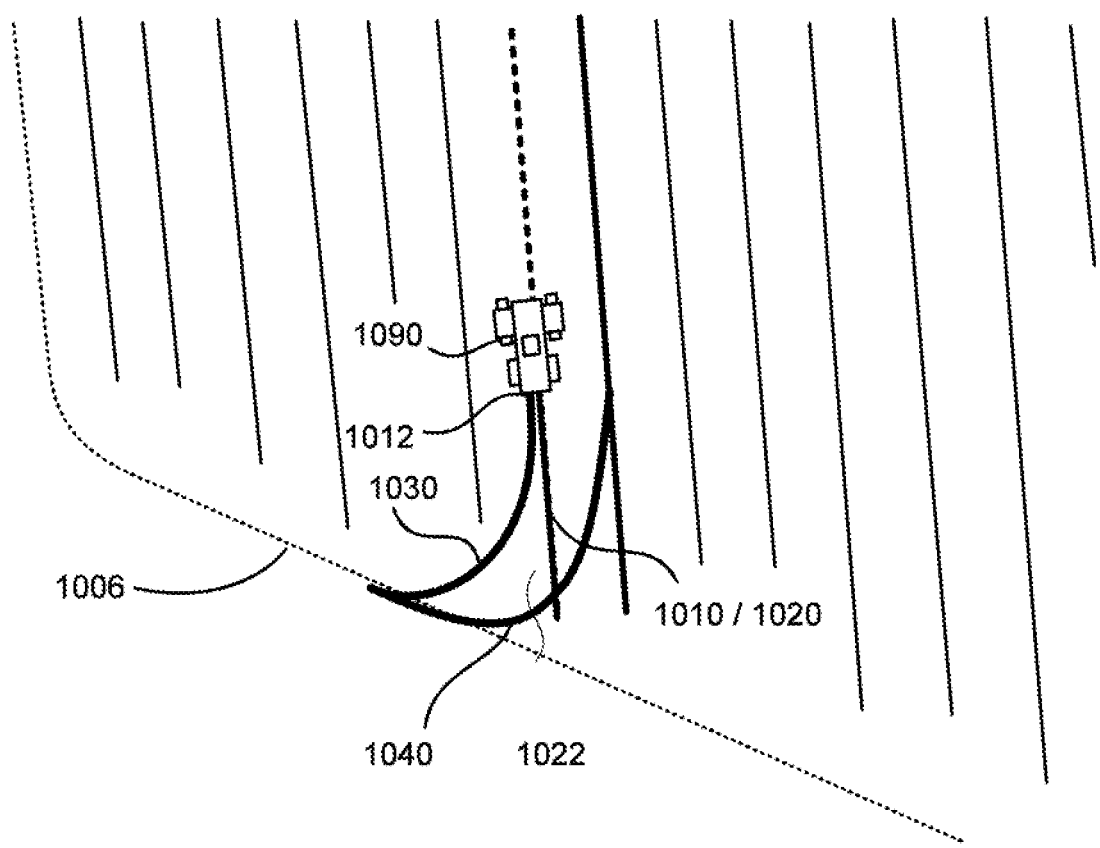
FIG. 10 illustrates an exemplary two-segment turn that follows a headland pattern with the move-to-end-of-swath-before-turn (MESBT) feature according to some embodiments.

FIG. 10 illustrates an exemplary two-segment turn that follows a headland pattern with the MESBT feature according to some embodiments. In this example, the vehicle 1090 is in the forward gear facing the end of the swath 1022. The trajectory generated by a path planner may first take the vehicle 1090 from its current position to the end of the swath 1022 in the forward gear, then back to the beginning position 1012 of the turn in the reverse gear, then executes the first segment 1030 of the turn in the forward gear, followed by the second segment 1040 of the turn in the reverse gear. Thus, in this example of a two-segment turn, the trajectory effectively includes four segments. The segment 1010 that takes the vehicle 1090 from its current position to the end of the swath 1022, and the segment 1020 (almost overlaying the segment 1010) that takes the vehicle 1090 from the end of the swath 1022 to the beginning position 1012 of the turn may be referred to as initial segments.

According to some embodiments, a user may select a move-to-beginning-of-next-swath-after-turn (MBSAT) option. If the MBSAT option is turned on, a path planner may produce a trajectory in which, after the turn has been completed, the vehicle moves from the ending position of the turn to the beginning of the next swath. The MBSAT feature may be applied to one-segment turns, as well as multi-segment turns with two or more segments. The MBSAT option may be applied independently, or in combination with the MESBT option.

Figure 11:
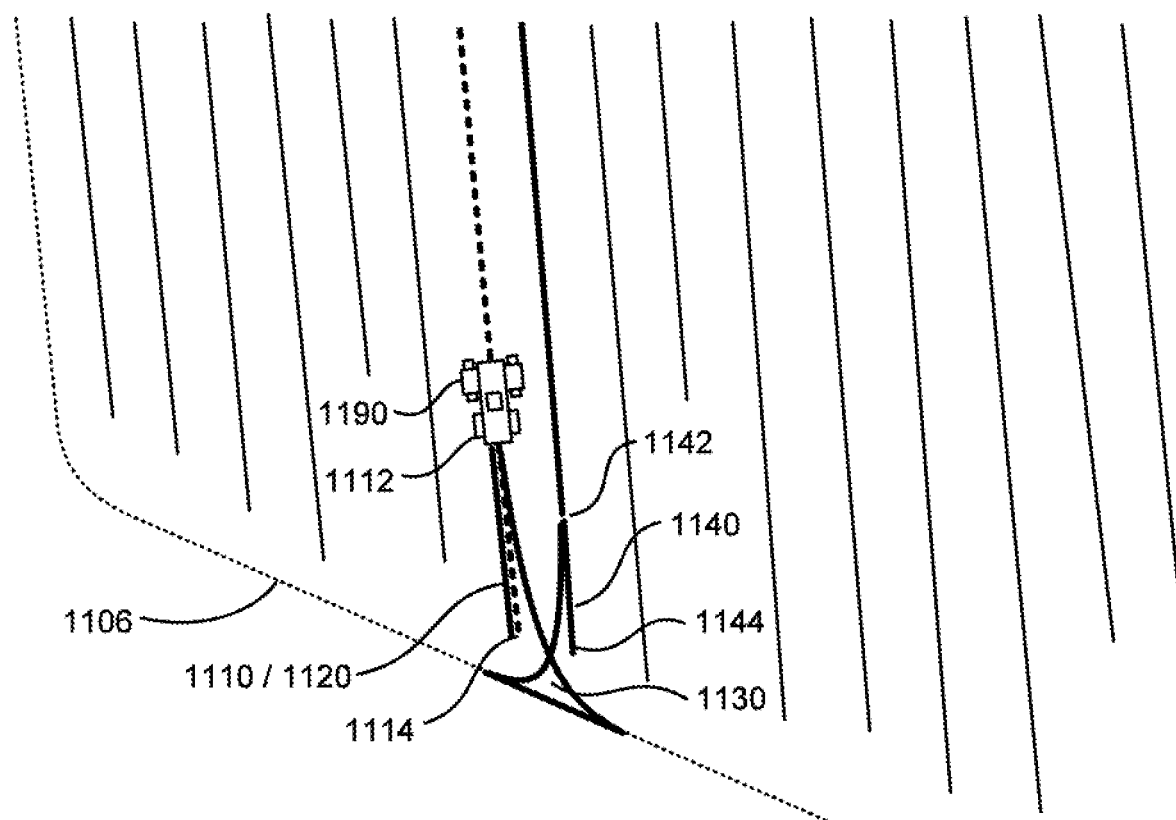
FIG. 11 illustrates an exemplary three-segment HF turn with both the MESBT feature and the move-to-beginning-of-next-swath-after-turn (MBSAT) feature according to some embodiments.

FIG. 11 illustrates an exemplary three-segment HF turn with both the MESBT feature and the MBSAT feature according to some embodiments. The trajectory may first take the vehicle 1190 from its current position to the end of the swath 1114, then back to the beginning position 1112 of the turn, then executes the three-segment turn 1130 ending at the ending position 1142 of the turn, then to the beginning 1144 of the next swath. The segment 1110 that takes the vehicle 1190 from its current position to the end of the swath 1114, and the segment 1120 (almost overlaying the segment 1110) that takes the vehicle 1190 from the end of the swath 1114 to the beginning position 1112 of the turn may be referred to as initial segments. The segment 1140 that takes the vehicle 1190 from the ending position 1142 of the turn to the beginning of the next swath 1144 may be referred to as the final segment. Thus, in this example, the entire trajectory of the three-segment turn effectively includes six segments: two initial segments, one final segment, plus three segments in the turn.

According to some embodiments, a user may select a turn-within-boundary (TWB) option for one-segment turns, as well as for multi-segment turns. The TWB option may be available when the headland-following (HF) option is turned off (if the HF option is turned on, the TWB may be automatically on).

Figure 12:
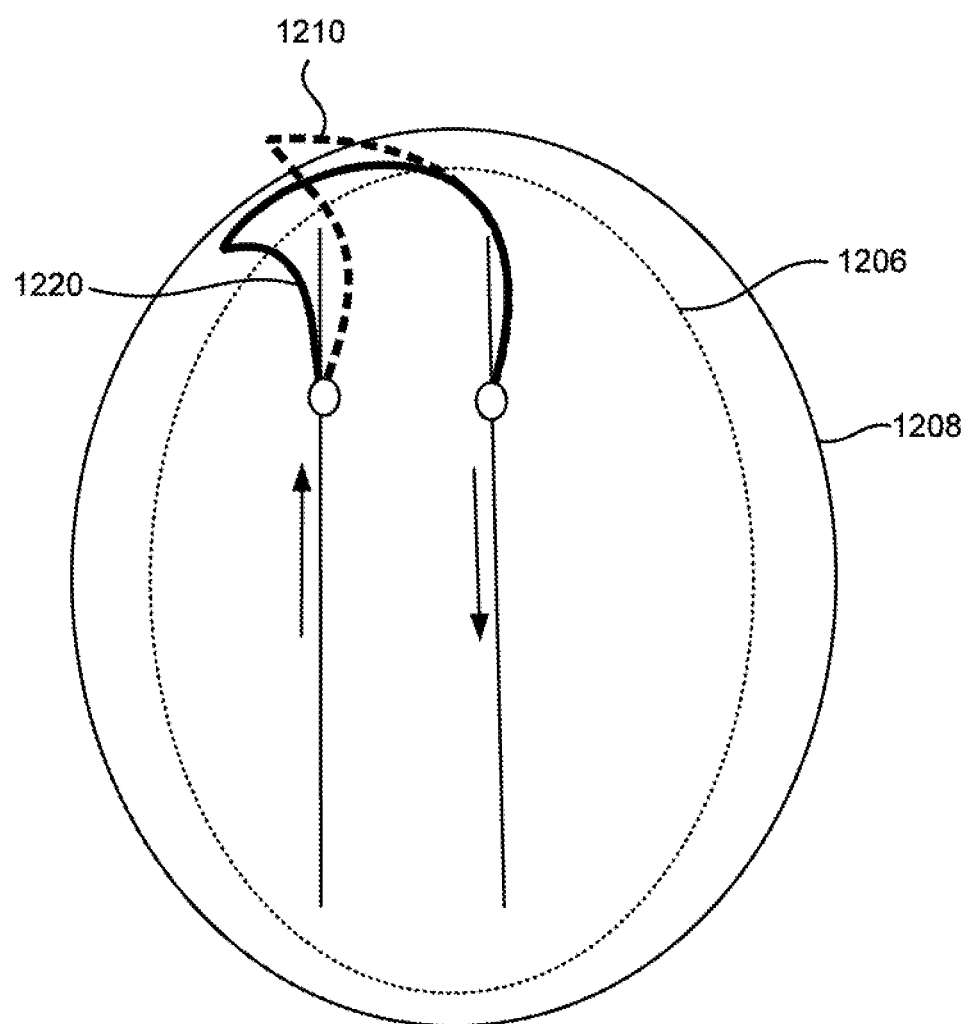
FIG. 12 illustrates some exemplary two-segment turns with the turn-within-boundary (TWB) option turned on and off, respectively.

FIG. 12 illustrates exemplary two-segment turns with the TWB option turned on and off, respectively. The work area is bounded by a boundary 1208, which may be a geofence. A guidance line 1206 may be inwardly offset from the boundary 1208. When the TWB option is turned off, a trajectory 1210 of a two-segment turn may go beyond the boundary 1208. When the TWB option is turn on, a trajectory 1220 of a two-segment turn may be confined within the boundary 1208. (Note that, if the HF option is turned on, a trajectory of a two-segment turn may partially follow the guidance line 1206, e.g., as illustrated in FIG. 7A, which effectively confines the trajectory within the boundary 1208.) In some embodiments, a path-planning algorithm may treat the boundary 1208 as an obstacle and perform trajectory optimization with obstacle avoidance, in which the shape of the turn may be changed so as to avoid the obstacles.

Figure 13A:
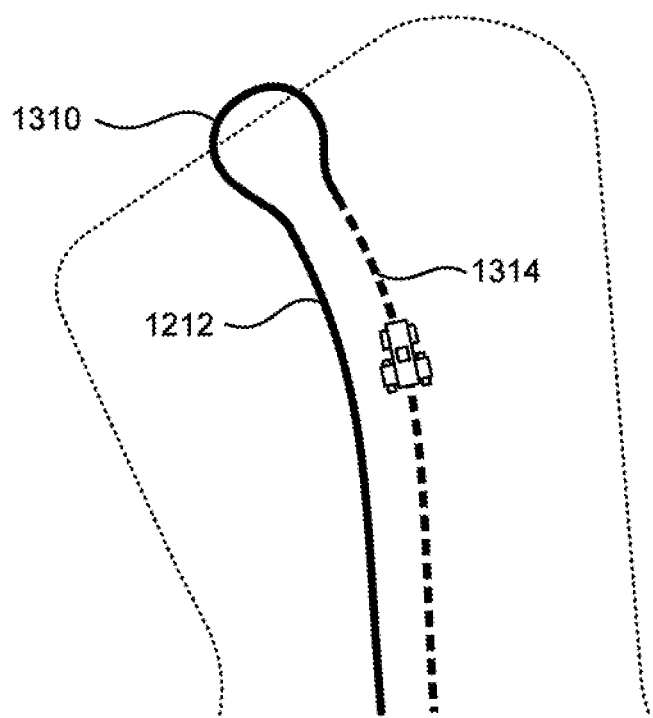
FIGS. 13A and 13B illustrate exemplary one-segment turns for curved swaths according to some embodiments.

Although the examples illustrated above show straight swaths, the various embodiments discussed above can be applied to curved swaths as well. FIG. 13A illustrates an example of a one-segment turn 1310 from a current swath 1312 to a next swath 1314, both of which are curved.

Figure 13B:
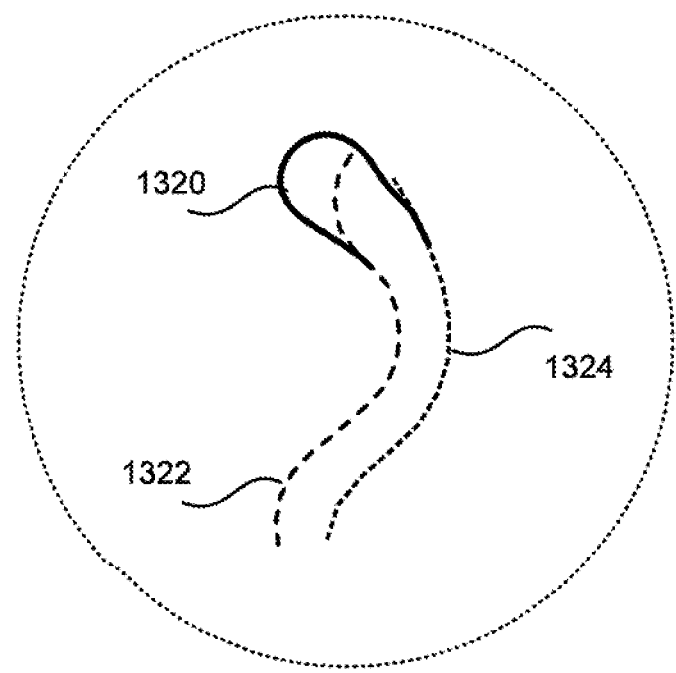

According to various embodiments, the turns (including one-segment turns and multi-segment turns) can have arbitrary shapes. FIG. 13B illustrates an example of a one-segment turn 1320 from a current swath 1322 to a next swath 1324. In this example, both the current swath 1322 and the next swath 1324 are curved. As illustrated, the one-segment turn 1320 in this example does not have a fixed bulb shape.

Figure 13C:
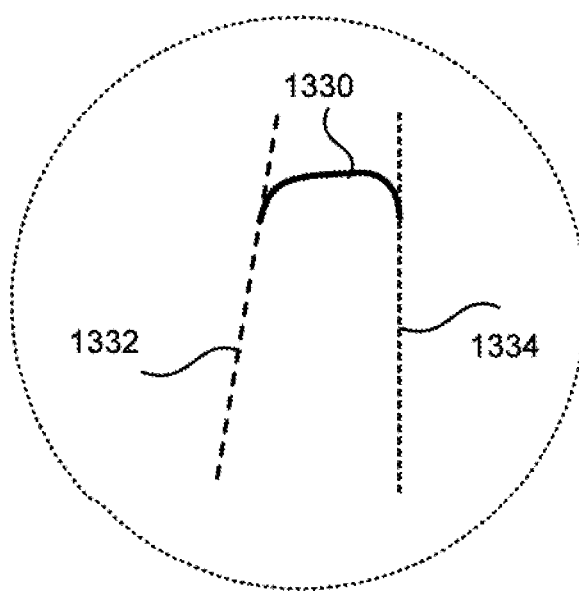
FIGS. 13C and 13D illustrate exemplary one-segment turns for non-parallel swaths according to some embodiments.
Figure 13D:
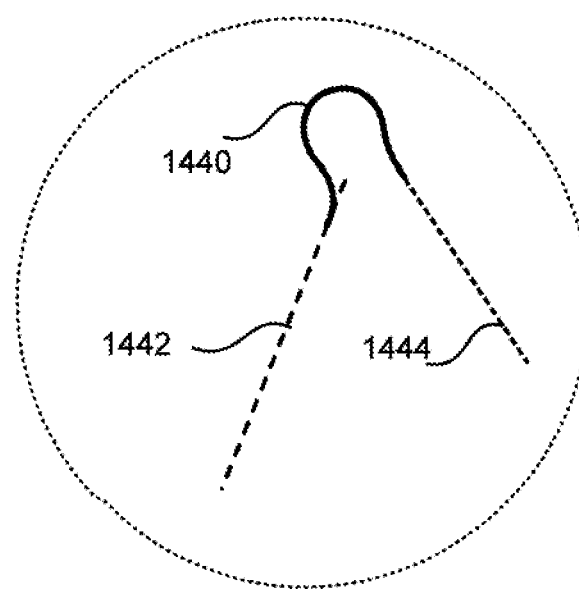

The various embodiments discussed above can also be applied to swaths that are not parallel to each other. FIG. 13C illustrates an example of a one-segment turn 1330 from a current swath 1332 to a next swath 1334, wherein the current swath 1332 and the next swath 1334 are not parallel to each other. FIG. 13D illustrates another example of a one-segment turn 1340 from a current swath 1342 to a next swath 1344, wherein the current swath 1342 and the next swath 1344 are not parallel to each other. The trajectory of the turn can be an arbitrary shape. For example, it can be a bulb-like shape as illustrated in FIG. 13D, or a U-like shape as illustrated in FIG. 13C, or it can be any other shape. The path-planning algorithms may determine an optimal trajectory that meets certain optimization criteria regardless of the shape of the trajectory.

Figure 14:
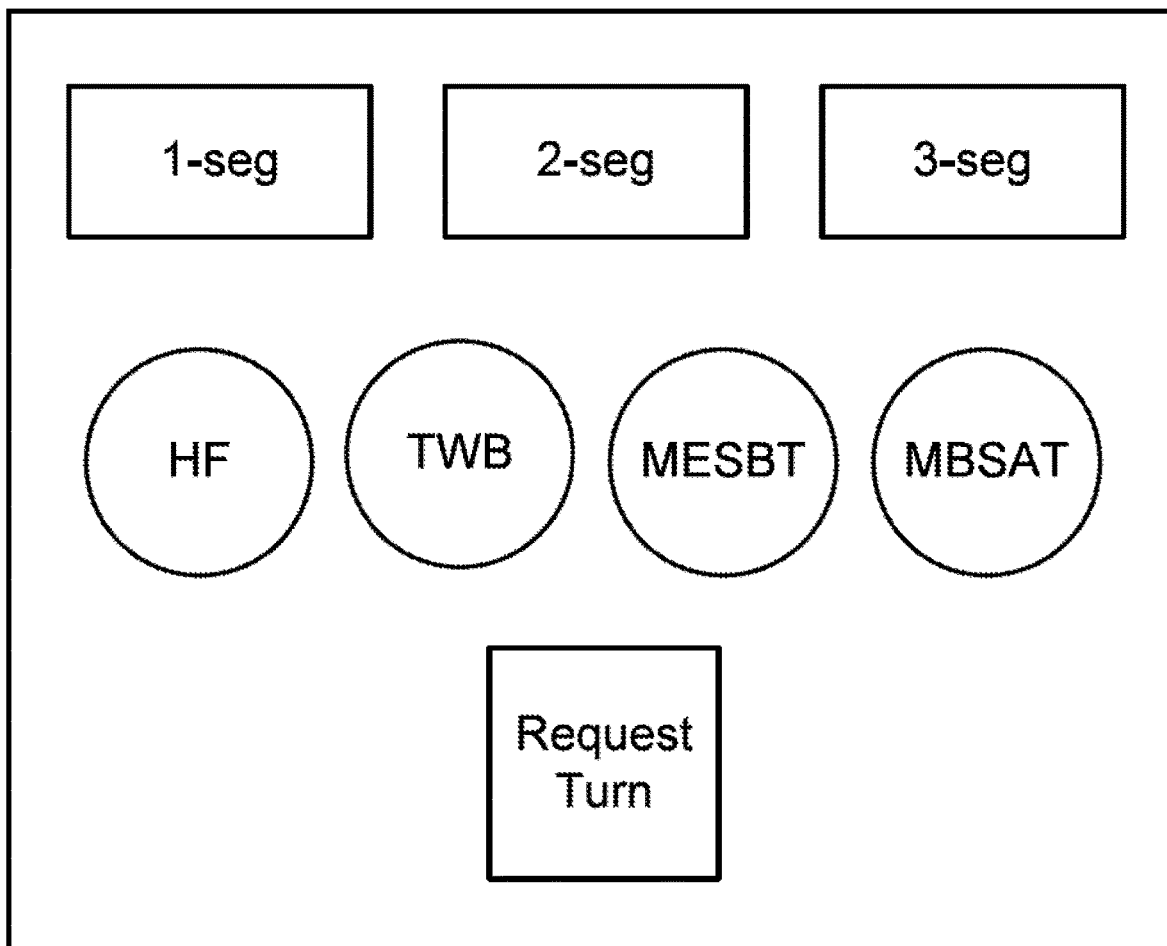
FIG. 14 shows an exemplary user interface (UI) for a user to select a desired type of turn according to some embodiments.

FIG. 14 shows an exemplary user interface (UI) for a user to select a desired type of turn according to some embodiments. The user interface may be implemented as selectable options on a display, or as hardware buttons.

The user may select one of the options "1-seg," "2-seg," or "3-seg" to select a one-segment turn, a two-segment turn, or a three-segment turn. Only one of the options can be selected. If no option is selected, the default may be a one-segment turn.

The "HF" (headland-following) option is a toggle button that can be turned on or off.

The "TWB" (turn-within-boundary) option is a toggle button that can be turned on or off if the "HF" option is turned off. If the "HF" option is turned on, "TWB" is automatically turned on.

The "MESBT" (move-to-end-of-swath-before-turn) option is a toggle button that can be turned on or off if "HF" is on. According to some embodiments, if "HF" is turned off, the MESBT option will not be available (i.e., it cannot be turn on).

The "MBSAT" (move-to-beginning-of-next-swath-after-turn) option is a toggle button that can be turned on or off if "HF" is on. According to some embodiments, if "HF" is turned off, the MBSAT option will not be available (i.e., it cannot be turn on).

When the "Request Turn" button is pressed, a command will be sent to the path planner for generating a trajectory for the requested type of turn. According to some embodiments, the generated trajectory may be displayed on a display screen.

In a path planning algorithm for an autonomous vehicle, the inputs may include a start position, a desired goal position, and mechanical constraints of the vehicle. Given these inputs, the algorithm may seek to find an optimal path from the start position to the goal position under certain optimization criteria. Exemplary optimization criteria may include traveling distance, coverage area, fuel efficiency, and the like.

Figure 15A:
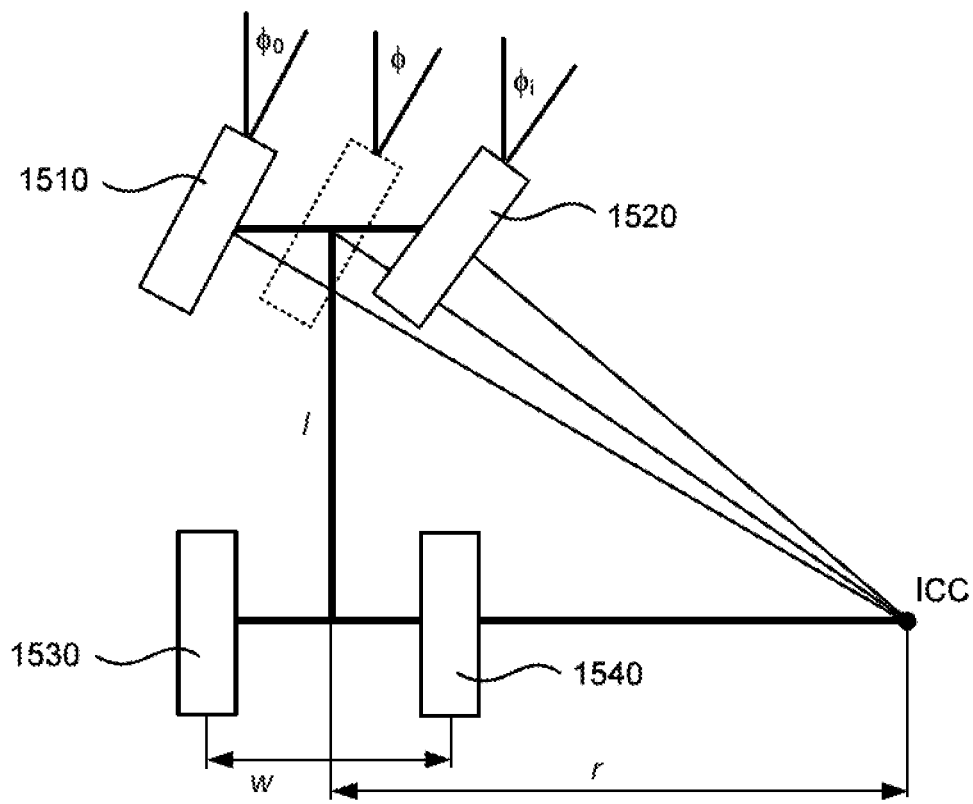
FIGS. 15A and 15B illustrate schematically a vehicle model according to some embodiments.
Figure 15B:
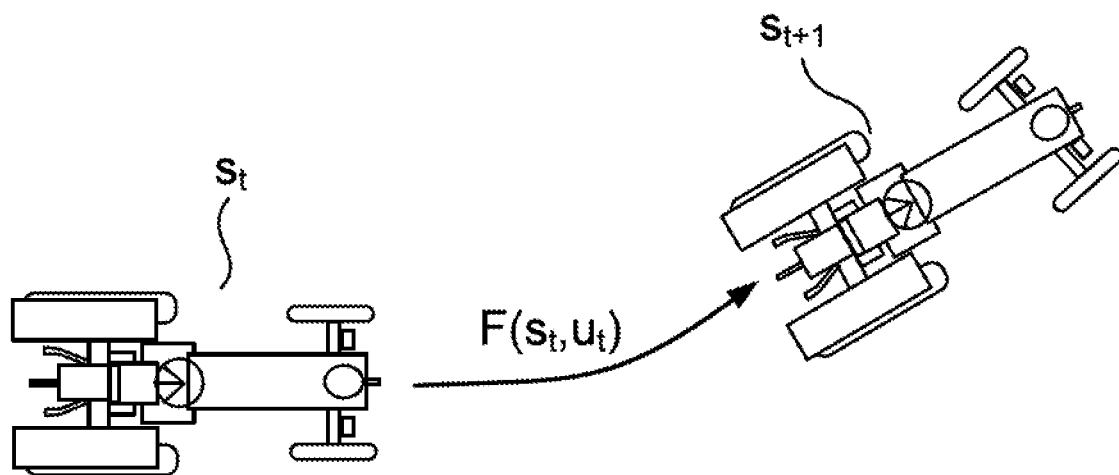
Figure 16A:
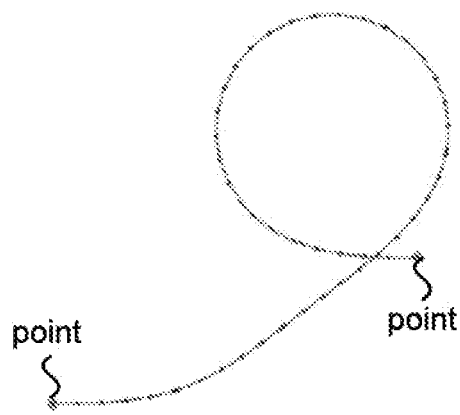
FIGS. 16A-16D illustrate four types of trajectory optimization according to some embodiments.
Figure 16B:
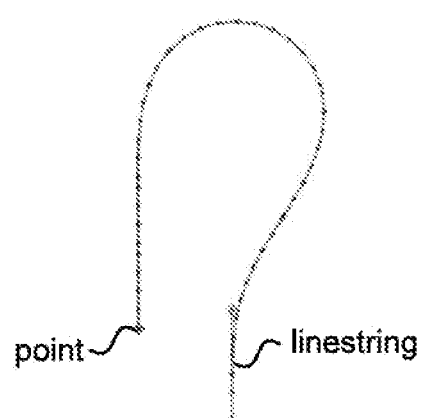
Figure 16C:
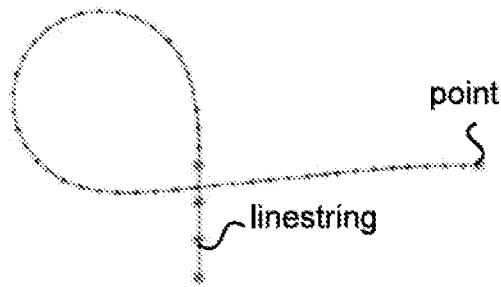
Figure 16D:
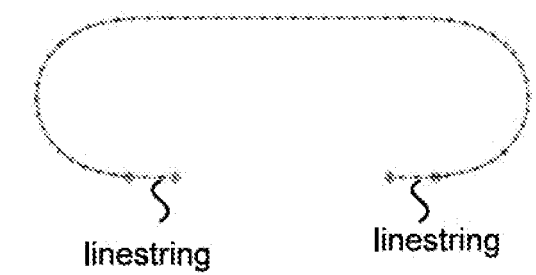

FIGS. 15A and 15B illustrate schematically a vehicle model. The vehicle includes front wheels 1510 and 1520, and rear wheels 1530 and 1540. The rear wheels 1530 and 1540 are separated from each other by a width w. The front wheels and the rear wheels are separated by a distance l. In an active front steering integrated chassis control system, the effective steering angle $\phi$ may be between the steering angles of the left and right front wheels $\phi_o$ and $\phi_i$. Vehicle mechanical constraints may include the velocity of the vehicle, the slew rate of the vehicle (i.e., the rate of change of steering angle), maximum steering angle, the length of the vehicle, and the like, as well as the footprint and the mechanical constraints of an attached implement. The dynamic motion of the vehicle may be expressed as, $$s_{t+1}=F(s_t, u_t),$$

where $s_t$ is the current pose at time t, which may include the (x, y, yaw, curvature, and the like) coordinates; $s_{t+1}$ is the future pose at t+1; and $u_t$ is the action, which may include speed, steering, and the like. Curvature of a vehicle is a path planning entity that relates to the steering angle and wheelbase of the vehicle. For example, if the steering angle is high, then curvature is high, and if the steering angle is low then the curvature is low. In some embodiments, the curvature may be defined as the tangent of the steering angle divided by the wheelbase.

According to some embodiments, search-based methods may be used for path planning. Search techniques may include blind search techniques (e.g., depth first search (DFS), breadth first search (BFS), and the like), and heuristic search techniques (e.g., hill climbing search, best-first search, greedy search, A* search, and the like).

Path planning for turns from one swath to a next swath may optimize distance from a start pose of the vehicle (or its implement) to a desired goal pose of the vehicle. Such path planning may involve four types of trajectory optimization: point-to-point, point-to-linestring, linestring-to-point, and linestring-to-linestring, as illustrated in FIGS. 16A-16D. A point may comprise a pose. A linestring may comprise a sequence of points. For example, point-to-point trajectory optimization might be used for a turn in which the aim is to find the shortest feasible single segment from one point on start swath to another point on the goal swath (for example an adjacent point on the next swath). Linestring-to-linestring trajectory optimization might be used for an end of-row-turn in which the aim is to find the shortest feasible single segment turn that is within the boundary and can go as close as possible to the end of current swath and as close as possible to the beginning of next swath. As another example, point-to-linestring or a linestring-to-point trajectory optimization may be used in a two-segment turn. There, the aim may be to go from the vehicle's current position (which is a point) to the portion of the headland in front of the vehicle (which is a linestring); then the vehicle reverses from its current position on the headland (which is a point) to the next swath (which is a linestring).

Figure 17:
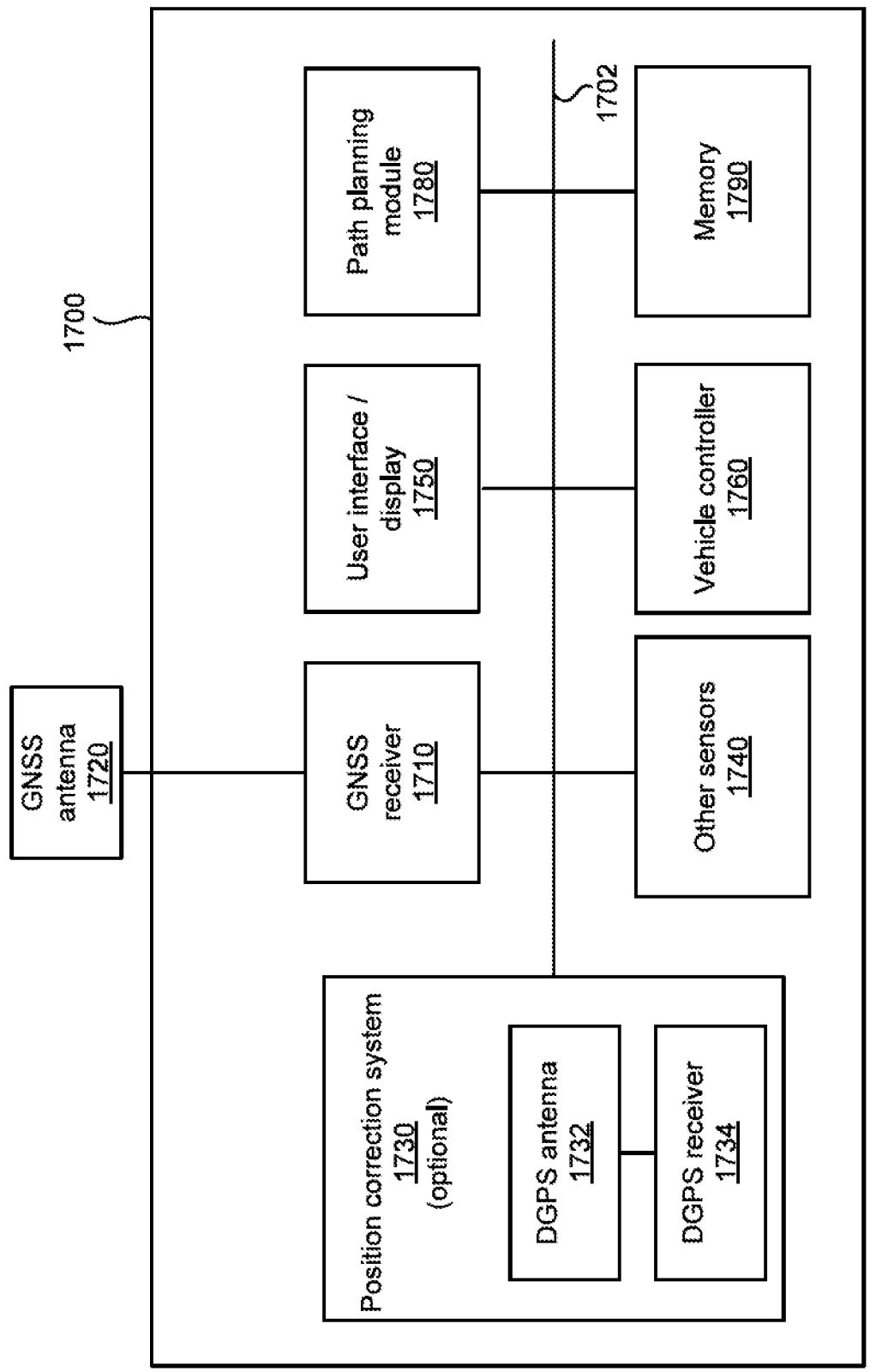
FIG. 17 shows a simplified diagram of a system for an autonomous vehicle according to some embodiments.

FIG. 17 shows a simplified diagram of a system 1700 for an autonomous vehicle according to some embodiments. The system 1700 may include a path planning module 1780, and a user interface 1750. The user interface 1750 may allow a user to request and accept a turn, and to specify a type of turn, as discussed above. In some embodiments, the user interface 1750 may also include a display.

The path planning module 1780 may include one or more computer processors configured to determine a trajectory for the requested turn according to the various embodiments as discussed above. In some embodiments, the trajectory may be displayed in a display (e.g., the display in the user interface 1750). The path planning module 1780 may also be configured to perform other navigation planning and/or coverage planning (e.g., planning the trajectories of the swaths) for the autonomous vehicle.

The system 1700 may include a memory 1790. The memory 1790 may store information needed for the path planning module 1780, as well as other information. For example, the memory 1790 may store information about a work area, such as a boundary (e.g., a geofence) and headland patterns (i.e., guidance lines). The memory 1790 may also store information of the swaths (which may be predetermined or generated by the path planning module 1780). The memory 1790 may also store computer-executable instructions to be executed by the computer processors of the path planning module 1780. The memory 1790 may comprise a volatile memory random access memory (RAM), or non-volatile data storage device such as a hard disk drive, flash memory or other optical or magnetic storage device. In some embodiments, the path planning module 1780 may include its own memory.

The system 1700 may include a global navigation satellite systems (GNSS) antenna 1720 attached to the autonomous vehicle, and a GNSS receiver 1710 coupled to the GNSS antenna 1720. The GNSS receiver 1710 may be configured to determine a current position of the vehicle based on the satellite signals received from GNSS satellites. In some embodiments, the system 1700 may also include an optional position correction system 1730. The position correction system 1730 may include an antenna 1732 and a receiver 1734 for receiving correction data from a reference station or a network of reference stations. For example, the position correction system 1730 may include a differential global positioning system (DGPS). The correction data may be used by the GNSS receiver 1710 to determine a more precise position of the vehicle (e.g., to millimeter or sub-millimeter accuracies). In some embodiments, the GNSS receiver 1710 may be an independent unit separate from the system 1700.

The system 1700 may include other sensors 1740. For example, the other sensors 1740 may include LiDAR sensors for obstacle detection, inertial measurement units or IMUS (e.g., accelerometers and gyroscopes), wheel angle sensors, and the like.

The system 1760 may include a vehicle controller 1760. The vehicle controller 1760 may be configured to operate the vehicle based on the sensor data (e.g., including GNSS data and other sensor data) and the trajectories determined by the path planning module 1780. For example, the path planning module 1780 may output a trajectory for a turn, along with a speed profile and optionally an implement profile for the trajectory, to the vehicle controller 1760, so that the vehicle controller 1760 may execute the turn according to the trajectory. The speed profile includes a respective speed for each respective point of the plurality of points.

In some embodiments, the various components of the system 1700 may be interconnected with each other via a bus 1702. In some other embodiments, the various components may be connected with each other in other ways.

Figure 18:
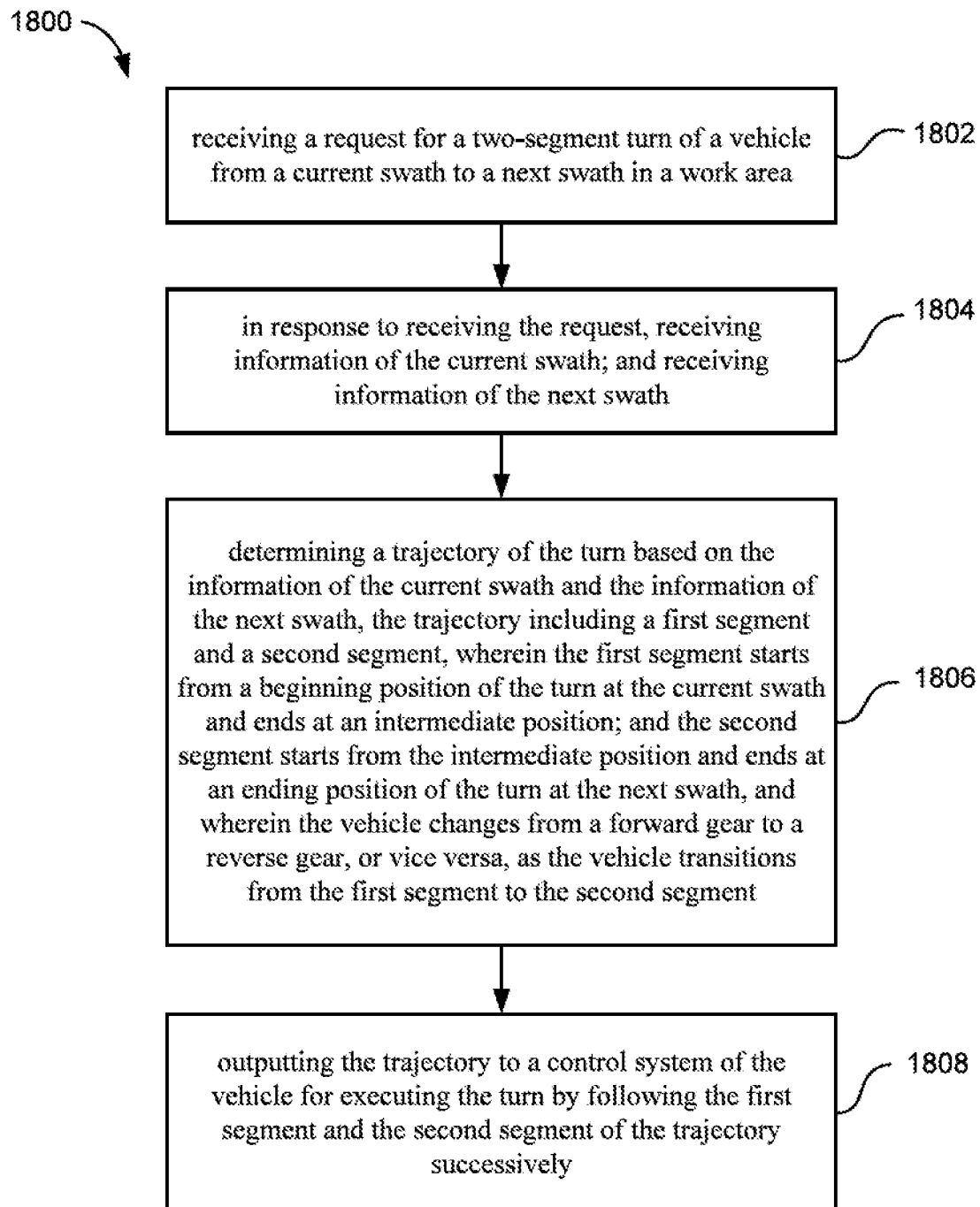
FIG. 18 is a simplified flowchart illustrating a method of path planning for an autonomous vehicle to make a turn according to some embodiments.

FIG. 18 is a simplified flowchart illustrating a method 1800 of path planning for an autonomous vehicle to make a turn according to some embodiments.

The method 1800 includes, at 1802, receiving a request for a two-segment turn of a vehicle from a current swath to a next swath in a work area, and at 1804, in response to receiving the request, receiving information of the current swath and information of the next swath.

The method 1800 further includes, at 1806, determining a trajectory of the turn based on the information of the current swath and the information of the next swath. The trajectory includes a first segment and a second segment. The first segment starts from a beginning position of the turn at the current swath and ends at an intermediate position; and the second segment starts from the intermediate position and ends at an ending position of the turn at the next swath. The vehicle changes from a forward gear to a reverse gear, or vice versa, as the vehicle transitions from the first segment to the second segment.

The method 1800 further includes outputting the trajectory to a control system of the vehicle for executing the turn by following the first segment and the second segment of the trajectory successively.

It should be appreciated that the specific steps illustrated in FIG. 18 provide a particular method of path planning for an autonomous vehicle to make a turn according to some embodiments. Other sequences of steps may also be performed according to alternative embodiments. For example, alternative embodiments of the present invention may perform the steps outlined above in a different order. Moreover, the individual steps illustrated in FIG. 18 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 19:
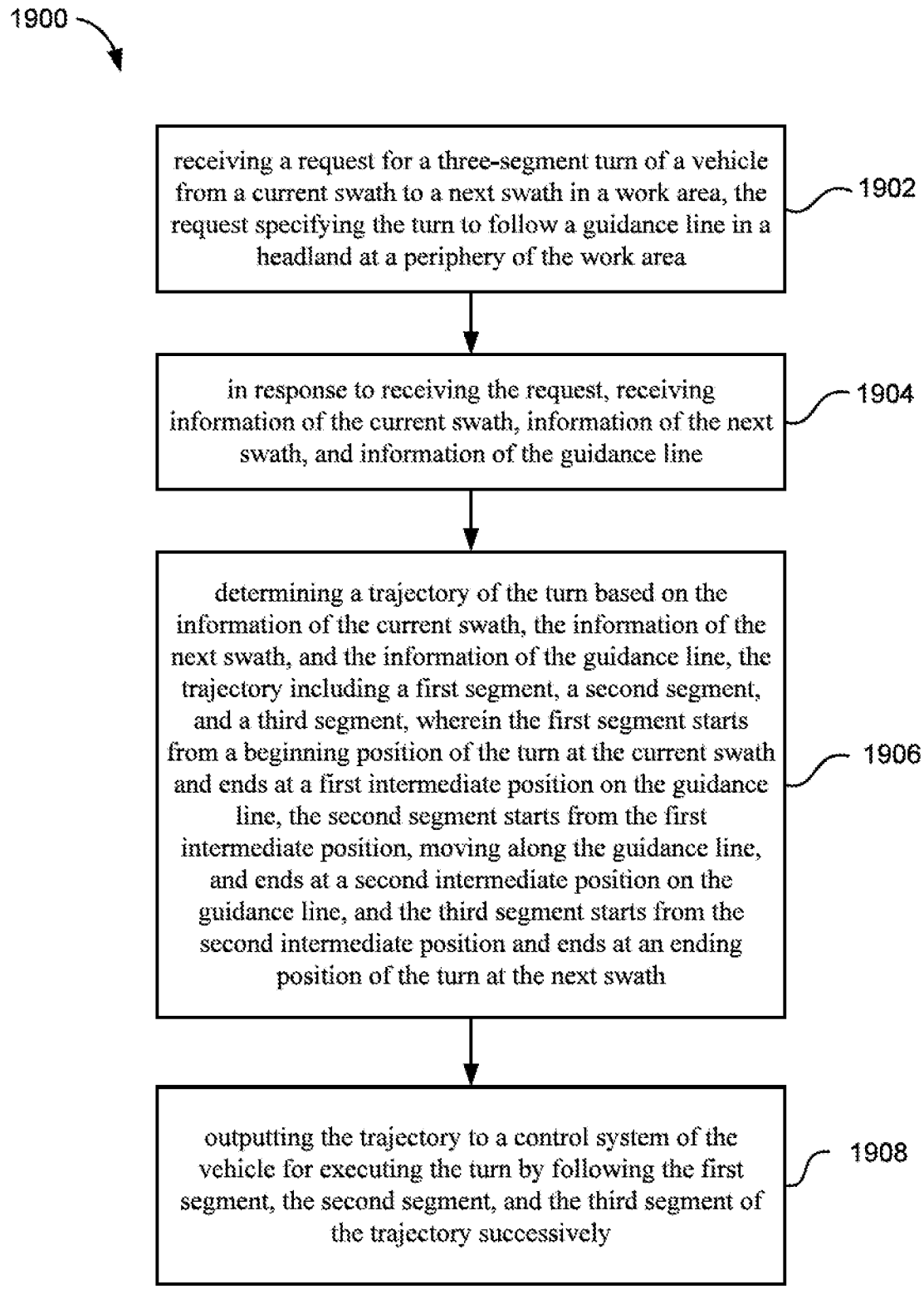
FIG. 19 is a simplified flowchart illustrating a method of path planning for an autonomous vehicle to make a turn according to some embodiments.

FIG. 19 is a simplified flowchart illustrating a method 1900 of path planning for an autonomous vehicle to make a turn according to some embodiments.

The method 1900 includes, at 1902, receiving a request for a three-segment turn of a vehicle from a current swath to a next swath in a work area. The request specifies that the turn is to follow a guidance line in a headland at a periphery of the work area. The method 1900 further includes, at 1904, in response to receiving the request, receiving information of the current swath, information of the next swath, and information of the guidance line.

The method 1900 further includes, at 1906, determining a trajectory of the turn based on the information of the current swath, the information of the next swath, and the information of the guidance line. The trajectory includes a first segment, a second segment, and a third segment. The first segment starts from a beginning position of the turn at the current swath and ends at a first intermediate position on the guidance line. The second segment starts from the first intermediate position, moving along the guidance line, and ends at a second intermediate position on the guidance line. The vehicle changes from a forward gear to a reverse gear, or vice versa, as the vehicle transitions from the first segment to the second segment. The third segment starts from the second intermediate position and ends at an ending position of the turn at the next swath. The vehicle changes from the reverse gear to the forward gear, or vice versa, as the vehicle transitions from the second segment to the third segment.

The method 1900 further includes, at 1908, outputting the trajectory to a control system of the vehicle for executing the turn by following the first segment, the second segment, and the third segment of the trajectory successively.

It should be appreciated that the specific steps illustrated in FIG. 19 provide a particular method of path planning for an autonomous vehicle to make a turn according to some embodiments. Other sequences of steps may also be performed according to alternative embodiments. For example, alternative embodiments of the present invention may perform the steps outlined above in a different order. Moreover, the individual steps illustrated in FIG. 19 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 20:
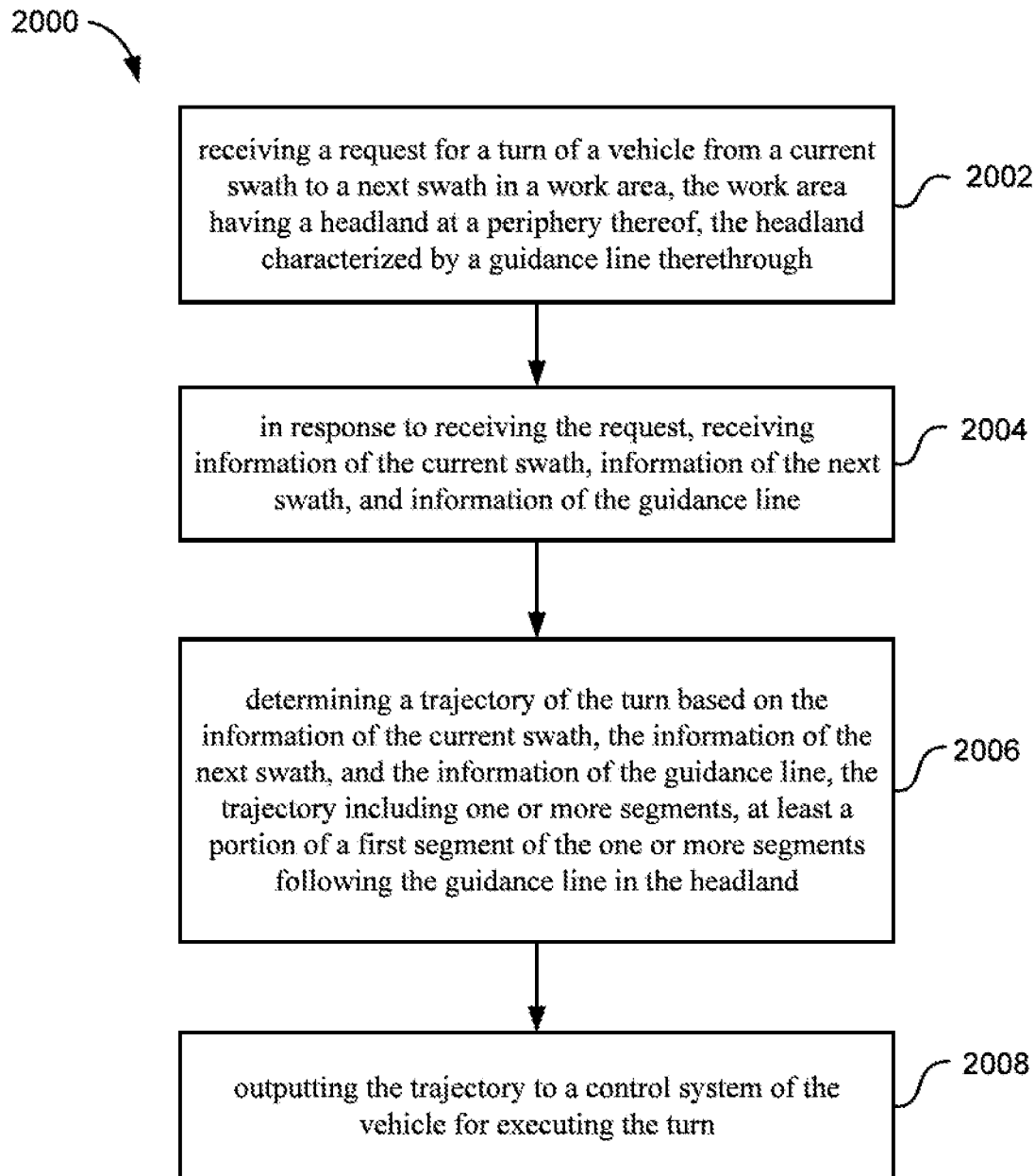
FIG. 20 is a simplified flowchart illustrating a method of path planning for an autonomous vehicle to make a turn according to some embodiments.

FIG. 20 is a simplified flowchart illustrating a method 2000 of path planning for an autonomous vehicle to make a turn according to some embodiments.

The method 2000 includes, at 2002, receiving a request for a turn of a vehicle from a current swath to a next swath in a work area. The work area has a headland at a periphery thereof. The headland characterized by a guidance line therethrough. The method 2000 further includes, at 2004, in response to receiving the request, receiving information of the current swath, information of the next swath, and information of the guidance line.

The method 2000 further includes, at 2006, determining a trajectory of the turn based on the information of the current swath, the information of the next swath, and the information of the guidance line. The trajectory includes one or more segments. At least a portion of a first segment of the one or more segments follows the guidance line in the headland.

The method 2000 further includes, at 2008, outputting the trajectory to a control system of the vehicle for executing the turn.

It should be appreciated that the specific steps illustrated in FIG. 20 provide a particular method of path planning for an autonomous vehicle to make a turn according to some embodiments. Other sequences of steps may also be performed according to alternative embodiments. For example, alternative embodiments of the present invention may perform the steps outlined above in a different order. Moreover, the individual steps illustrated in FIG. 20 may include multiple sub-steps that may be performed in various sequences as appropriate to the individual step. Furthermore, additional steps may be added or removed depending on the particular applications. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of path planning for an autonomous vehicle, the method comprising:
   receiving a request for a two-segment turn of a vehicle from a current swath to a next swath in a work area defined by a geofence, the request specifying the two-segment turn at least partially follows a guidance line in a headland at a periphery of the work area, wherein:
   the vehicle has an implement attached thereto;
   the headland has a width extending between the geofence and an inner boundary of the headland; and
   the guidance line is offset from the inner boundary of the headland by approximately one half the width of the implement;
   in response to receiving the request, receiving information of the current swath and information of the next swath;
   determining a trajectory of the two-segment turn based on the information of the current swath and the information of the next swath, the trajectory including a first segment and a second segment, wherein:
   the first segment starts from a beginning position of the two-segment turn at the current swath and ends at an intermediate position; and
   the second segment starts from the intermediate position and ends at an ending position of the two-segment turn at the next swath, wherein the vehicle changes from a forward gear to a reverse gear, or vice versa, as the vehicle transitions from the first segment to the second segment; and
   outputting the trajectory to a control system of the vehicle for executing the two-segment turn by following the first segment and the second segment of the trajectory successively.

2. The method of claim 1, wherein the request specifies the two-segment turn to be within the headland, the method further comprising:
   receiving information of the headland;
   wherein determining the trajectory of the two-segment turn is performed further based on the information of the headland, and wherein the trajectory of the two-segment turn is confined within the headland.

3. The method of claim 1, further comprising:
   receiving information of the guidance line;
   wherein determining the trajectory of the two-segment turn is performed further based on the information of the guidance line, and wherein at least a portion of the second segment of the trajectory follows the guidance line.

4. The method of claim 3, further comprising:
   receiving a current position of the vehicle;
   wherein determining the trajectory of the two-segment turn is performed further based on the current position of the vehicle, and wherein the trajectory further includes a third segment that starts from the current position of the vehicle and ends at the beginning position of the two-segment turn, and the third segment is to be executed before the first segment and the second segment are executed.

5. The method of claim 3, wherein the request specifies moving to an end position of the current swath before the two-segment turn, and wherein determining the trajectory of the two-segment turn is performed further based on the end position of the current swath, and the trajectory further includes:
   a third segment that starts from a current position of the vehicle and ends at the end position of the current swath; and
   a fourth segment that starts from the end position of the current swath and ends at the beginning position of the two-segment turn;
   wherein the third segment and the fourth segment are to be executed successively before the first segment and the second segment are executed.

6. The method of claim 3, wherein the request specifies moving to a beginning position of the next swath after the two-segment turn, and wherein determining the trajectory of the two-segment turn is performed further based on the beginning position of the next swath, and the trajectory further includes:
   a third segment that starts from the ending position of the two-segment turn and ends at the beginning position of the next swath, wherein the third segment is to be executed after the first segment and the second segment are executed.

7. The method of claim 3, wherein the guidance line is curved.

8. The method of claim 1, wherein determining the trajectory of the two-segment turn is performed such that a total distance traversed by the vehicle along the first segment and the second segment is minimized.

9. The method of claim 1, wherein at least one of the current swath and the next swath is curved.

10. The method of claim 1, wherein the current swath and the next swath are parallel to each other, or not parallel to each other.

11. The method of claim 1, wherein:
   in response to determining that the vehicle is traversing the current swath in the forward gear before the two-segment turn, determining gear settings of the vehicle during the two-segment turn such that the vehicle traverses the first segment in the forward gear, and traverses the second segment in the reverse gear; and
   in response to determining that the vehicle is traversing the current swath in the reverse gear before the two-segment turn, determining the gear settings of the vehicle during the two-segment turn such that the vehicle traverses the first segment in the reverse gear, and traverses the second segment in the forward gear.

12. The method of claim 1, wherein the trajectory includes a plurality of points, each respective point of the plurality of points characterized by a respective two-dimensional spatial coordinate, a respective yaw angle, and a respective curvature of the vehicle, and the method further comprising:
    determining a speed profile along the trajectory, the speed profile including a respective speed for each respective point of the plurality of points; and
    outputting the speed profile to the control system of the vehicle.

13. The method of claim 1, further comprising:
    determining an implement profile along the trajectory; and
    outputting the implement profile to the control system of the vehicle.

14. The method of claim 1, further comprising:
    displaying the trajectory on a user display.

15. A method of path planning for an autonomous vehicle, the method comprising:
    receiving a request for a three-segment turn of a vehicle from a current swath to a next swath in a work area defined by a geofence, the request specifying the three-segment turn to follow a guidance line in a headland at a periphery of the work area, wherein:
        the vehicle has an implement attached thereto;
        the headland has a width extending between the geofence and an inner boundary of the headland; and
        the guidance line is offset from the inner boundary of the headland by approximately one half the width of the implement;
    in response to receiving the request, receiving information of the current swath, information of the next swath, and information of the guidance line;
    determining a trajectory of the three-segment turn based on the information of the current swath, the information of the next swath, and the information of the guidance line, the trajectory including a first segment, a second segment, and a third segment, wherein:
        the first segment starts from a beginning position of the three-segment turn at the current swath and ends at a first intermediate position on the guidance line;
        the second segment starts from the first intermediate position, moving along the guidance line, and ends at a second intermediate position on the guidance line, wherein the vehicle changes from a forward gear to a reverse gear, or vice versa, as the vehicle transitions from the first segment to the second segment; and
        the third segment starts from the second intermediate position and ends at an ending position of the three-segment turn at the next swath, wherein the vehicle changes from the reverse gear to the forward gear, or vice versa, as the vehicle transitions from the second segment to the third segment; and
    outputting the trajectory to a control system of the vehicle for executing the three-segment turn by following the first segment, the second segment, and the third segment of the trajectory successively.

16. The method of claim 15, wherein the guidance line is curved.

17. The method of claim 15, wherein at least one of the current swath and the next swath is curved.

18. The method of claim 15, wherein the current swath and the next swath are parallel to each other, or not parallel to each other.

19. The method of claim 15, further comprising:
    receiving a current position of the vehicle;
    wherein determining the trajectory of the three-segment turn is performed further based on the current position of the vehicle, and wherein the trajectory further includes a fourth segment that starts from the current position of the vehicle and ends at the beginning position of the three-segment turn, and the fourth segment is to be executed before the first segment, the second segment, and the third segment are executed.

20. The method of claim 15, wherein the request specifies moving to an end position of the current swath before the three-segment turn, and wherein determining the trajectory of the three-segment turn is performed further based on the end position of the current swath, and the trajectory further includes:
    a fourth segment that starts from a current position of the vehicle and ends at the end of the current swath; and
    a fifth segment that starts from the end of the current swath and ends at the beginning position of the three-segment turn; and
    wherein the fourth segment and the fifth segment are to be executed successively before the first segment, the second segment, and the third segment are executed.

21. The method of claim 19, wherein the request specifies moving to a beginning position of the next swath after the three-segment turn, and wherein determining the trajectory of the three-segment turn is performed further based on the beginning position of the next swath, and the trajectory further includes:
    a fifth segment that starts from the ending position of the three-segment turn and ends at the beginning position of the next swath, wherein the fifth segment is to be executed after the first segment, the second segment, the third segment and the fourth segment are executed.

22. The method of claim 15, wherein:
    in the first segment of the trajectory, the vehicle moves from the beginning position of the three-segment turn toward the guidance line and in a direction toward the next swath;
    in the second segment of the trajectory, the vehicle moves from the first intermediate position along the guidance line in a direction toward the current swath to the second intermediate position; and
    in the third segment of the trajectory, the vehicle moves from the second intermediate position toward the next swath.

23. The method of claim 15, wherein:
    in the first segment of the trajectory, the vehicle moves from the beginning position of the three-segment turn toward the guidance line and in a direction away from the next swath;
    in the second segment of the trajectory, the vehicle moves from the first intermediate position along the guidance line toward the next swath to the second intermediate position; and
    in the third segment of the trajectory, the vehicle moves from the second intermediate position toward the next swath.

24. The method of claim 15, wherein determining the trajectory of the three-segment turn is performed such that a total distance traversed by the vehicle along the first segment, the second segment, and the third segment is minimized.

* * * * *